US012765719B2

United States Patent
(12) Lundberg

(10) Patent No.: US 12,765,719 B2
(45) Date of Patent: Oct. 20, 2026

(54) PELLET GRILLS HAVING SELECTABLE MANUAL COOK MODES

(71) Applicant: Weber-Stephen Products LLC, Palatine, IL (US)

(72) Inventor: Ryan P. Lundberg, Des Plaines, IL (US)

( * ) Notice: Subject to any disclaimer, the term of this patent is extended or adjusted under 35 U.S.C. 154(b) by 407 days.

(21) Appl. No.: 18/429,436

(22) Filed: Feb. 1, 2024

(65) Prior Publication Data

US 2024/0285123 A1 Aug. 29, 2024

Related U.S. Application Data

(60) Provisional application No. 63/486,906, filed on Feb. 24, 2023.

(51) Int. Cl.
*A47J 37/07* (2006.01)
*A47J 36/32* (2006.01)

(52) U.S. Cl.
CPC ......... *A47J 37/0754* (2013.01); *A47J 36/321* (2018.08); *A47J 37/079* (2013.01)

(58) Field of Classification Search
CPC ..... A47J 37/0754; A47J 36/321; A47J 37/079
See application file for complete search history.

(56) References Cited

U.S. PATENT DOCUMENTS 7,516,692 B2 4/2009 Pirkle et al.
7,647,923 B2 1/2010 Dahl
8,082,915 B2 12/2011 McCormick et al.
8,800,542 B1 8/2014 Kennington
10,092,129 B2 10/2018 Jenkins et al.
10,201,247 B1 2/2019 Jones
11,291,332 B2 4/2022 Parker et al.
11,534,023 B2 12/2022 Vaupot et al.
11,692,712 B2 7/2023 Li
2017/0164783 A1 6/2017 Sauerwein et al.
2020/0214501 A1 7/2020 Gafford et al.
2021/0052107 A1 2/2021 Pruitt et al.
2021/0356130 A1 11/2021 Li
2022/0279969 A1 9/2022 Vandyke et al.

OTHER PUBLICATIONS

International Searching Authority, "International Preliminary Report on Patentability," issued in connection with International Patent Application No. PCT/US2024/013920, dated Sep. 4, 2025, 6 pages.
International Searching Authority, "International Search Report and Written Opinion," issued in connection with International Patent Application No. PCT/US2024/013920, dated Jun. 4, 2024, 9 pages.

*Primary Examiner* — Alfred Basichas
(74) *Attorney, Agent, or Firm* — Avantech Law, LLP

(57) ABSTRACT

Pellet grills having selectable manual modes are disclosed. An example pellet grill includes memory, machine-readable instructions, and processor circuitry. The processor circuitry is to execute the machine-readable instructions to determine whether a cook mode selection received at the pellet grill is associated with a proportional-integral-derivative (PID) cook mode or a manual cook mode. In response to determining that the cook mode selection is associated with the manual cook mode, the processor circuitry is to execute the machine-readable instructions to command at least one of an auger or a fan of the pellet grill to perform a manually-controlled cooking operation based on an auger setting selection and a fan setting selection associated with the manual cook mode.

20 Claims, 12 Drawing Sheets

400

402 404 406

408

| LEVEL | AUGER PWM | FAN PWM |
|---|---|---|
| 1 | 75 | 145 |
| 2 | 87 | 145 |
| 3 | 100 | 192 |
| 4 | 112 | 192 |
| 5 | 125 | 192 |
| 6 | 137 | 192 |
| 7 | 150 | 192 |
| 8 | 162 | 192 |
| 9 | 175 | 192 |
| 10 | 187 | 192 |
| 11 | 200 | 192 |
| 12 | 212 | 192 |
| 13 | 225 | 192 |

FIG. 4

500

502 504 506

508

| GROUP | AUGER % | FAN % |
|---|---|---|
| 1 | 0 | 0-25 |
| 2 | 0-25 | 26-50 |
| 3 | 26-50 | 51-75 |
| 4 | 51-100 | 76-100 |

FIG. 5

600

602 604

| AUGER % | FAN % |
|---|---|
| 0-100 | 0-100 |

FIG. 6

PELLET GRILLS HAVING SELECTABLE MANUAL COOK MODES

RELATED APPLICATIONS

This application claims priority to U.S. Provisional Patent Application No. 63/486,906, filed Feb. 24, 2023. The entirety of U.S. Provisional Patent Application No. 63/486,906 is hereby incorporated by reference herein.

FIELD OF THE DISCLOSURE

This disclosure relates generally to pellet grills and, more specifically, to pellet grills having selectable manual cook modes.

BACKGROUND

Pellet grills are electronically-controlled cooking devices that are configured to cook (e.g., smoke, grill, bake, roast, broil, sear, and/or otherwise heat) food items located within (e.g., placed on one or more cooking grate(s) positioned within) a cooking chamber of the pellet grill. The controllable electronic components of the pellet grill can be powered via AC power (e.g., supplied to the pellet grill via household electricity or wall power) or DC power (e.g., supplied via an on-board or connected battery and/or DC power supply).

Conventional pellet grills store a volume of combustible pellet fuel (e.g., wood-based pellets) in a hopper of the pellet grill. A motor-driven auger in communication with an exit opening of the hopper feeds and/or supplies the pellet fuel from the hopper into a burn pot of the pellet grill in a controlled and/or automated manner. The speed, rate, and/or duty cycle of the auger is typically based on a user-selected temperature (e.g., a temperature setpoint) that is established and/or desired for the cooking chamber of the pellet grill. Pellet fuel that is deposited in the burn pot can initially be ignited via an ignitor (e.g., a glow plug) of the pellet grill. Combustion and/or burning of the pellet fuel within the burn pot produces, generates, and/or outputs heat which is subsequently distributed throughout the cooking chamber in a manner that causes the food items located within the cooking chamber to gradually become cooked. A motor-driven fan is typically implemented to assist with combusting the pellet fuel, and/or to assist with distributing and/or circulating heat (e.g., as may be produced by the combusted pellet fuel) throughout the cooking chamber. One or more operation(s) of the motor-driven auger and/or the motor-driven fan of the pellet grill is/are typically regulated via a proportional-integral-derivative (PID) controller of the pellet grill executing a closed-loop (e.g., feedback system) control process that is based on a measured temperature within a cooking chamber of the pellet grill relative to a temperature setpoint selected by a user of the pellet grill.

BRIEF DESCRIPTION OF THE DRAWINGS

FIG. 4 is a graphical representation of an example settings selection table for a bounded manual cook mode to be implemented by the pellet grill of FIG. 1.

FIG. 5 is a graphical representation of an example settings selection table for a partially-bounded manual cook mode to be implemented by the pellet grill of FIG. 1.

FIG. 6 is a graphical representation of an example settings selection table for an unbounded manual cook mode to be implemented by the pellet grill of FIG. 1.

Figure 1:
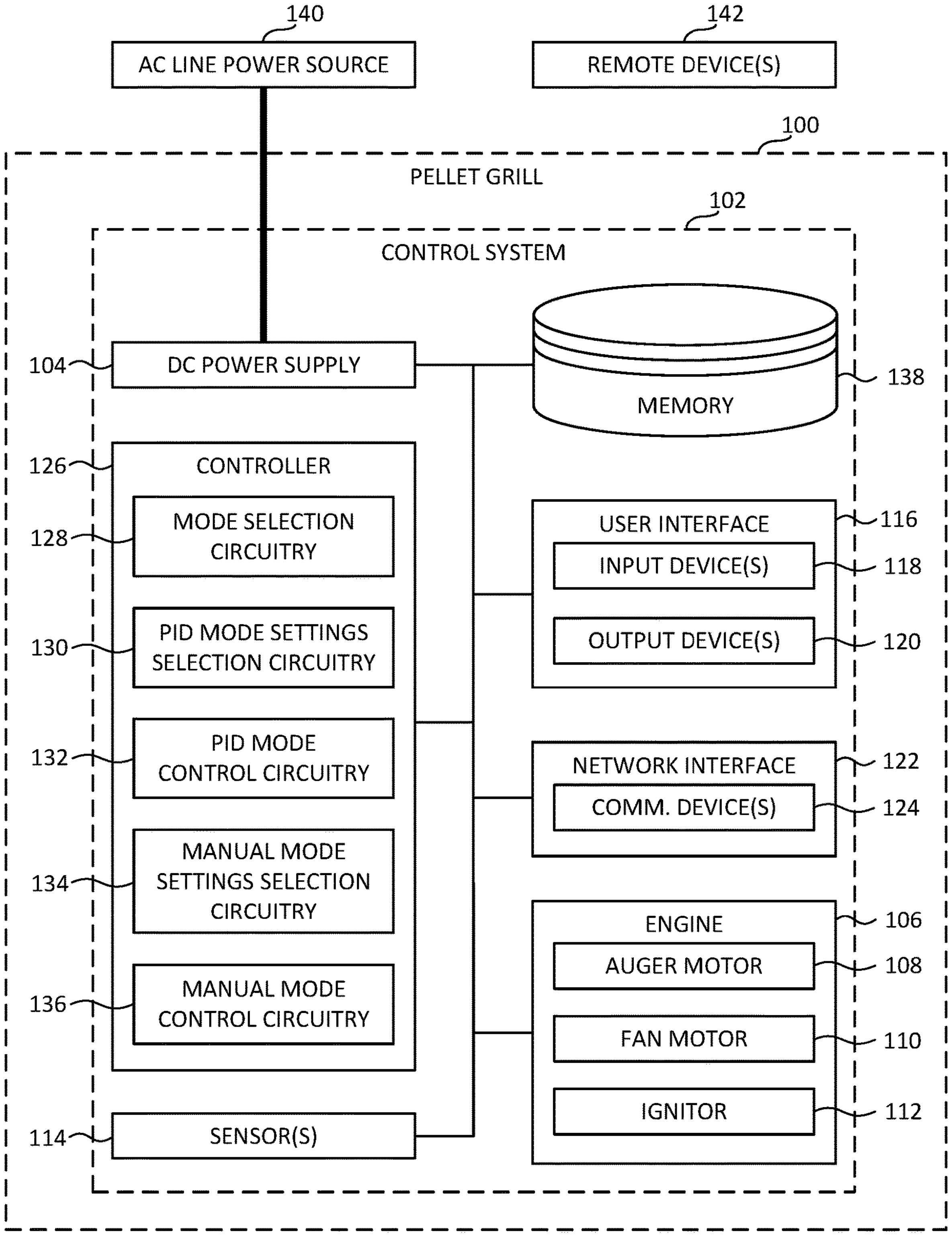
FIG. 1 is a block diagram of an example pellet grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

In conventional pellet grills, the operation(s) of a motor-driven auger and a motor-driven fan of the pellet grill is/are regulated via a PID controller of the pellet grill executing a closed-loop (e.g., feedback system) control process that is based on a measured temperature within a cooking chamber of the pellet grill relative to a temperature setpoint selected by a user of the pellet grill. The aforementioned closed-loop control process prevents a user of the pellet grill from having any direct control over the auger and/or over the fan in connection with performing one or more cooking operation(s) via the pellet grill. Unlike such conventional pellet grills which are limited to implementing a PID cook mode to perform a PID-controlled cooking operation, example pellet grills disclosed herein advantageously include one or more selectable manual cook mode(s) (e.g., one or more open-loop, non-feedback system(s)) that enable(s) a user of the pellet grill to have direct control over the auger and/or over the fan of the pellet grill in connection with performing one or more manually-controlled cooking operation(s) via the pellet grill.

In some disclosed examples, a pellet grill is configured to implement a selectable manual cook mode. In some disclosed examples, the pellet grill is configured to determine whether a cook mode selection received at the pellet grill is associated with a PID cook mode or a manual cook mode. In response to determining that the cook mode selection is associated with the manual cook mode, the pellet grill is configured to command at least one of an auger or a fan of the pellet grill to perform a manually-controlled cooking operation based on an auger setting selection and a fan setting selection associated with the manual cook mode. In some disclosed examples, the manually-controlled cooking operation is implemented via an open-loop control process.

In some disclosed examples, the pellet grill is configured to implement different types of selectable manual cook modes including, for example, a bounded manual cook mode, a partially-bounded manual cook mode, and/or an unbounded manual cook mode. Each type of selectable manual cook mode advantageously provides a different extent and/or a different degree of manual control (e.g., user control) over the manually-controlled cooking operation to be performed by the auger and/or the fan of the pellet grill. For example, a bounded manual cook mode enables selection of a level setting from among a plurality of available level settings associated with the bounded manual cook mode. In such an example, the auger setting selection and the fan setting selection are predetermined constants that are automatically selected and/or automatically determined based on the level setting selection of the bounded manual cook mode. As another example, a partially-bounded manual cook mode enables selection of a group setting from among a plurality of available group settings associated with the partially-bounded manual cook mode. In such an example, the auger setting selection is selected from among a plurality of available auger settings associated with the group setting selection of the partially-bounded manual cook mode, and the fan setting selection is selected from among a plurality of available fan settings associated with the group setting selection of the partially-bounded manual cook mode. As another example, an unbounded manual cook mode enables the auger setting selection to be selected from among a plurality of available auger settings associated with the unbounded manual cook mode, and further enables the fan setting selection to be selected from among a plurality of available fan settings associated with the unbounded manual cook mode.

The above-identified features as well as other advantageous features of example pellet grills having selectable manual cook modes as disclosed herein are further described below in connection with the figures of the application.

As used herein in a mechanical context, the term "configured" means sized, shaped, arranged, structured, oriented, positioned, and/or located. For example, in the context of a first object configured to fit within a second object, the first object is sized, shaped, arranged, structured, oriented, positioned, and/or located to fit within the second object. As used herein in an electrical and/or computing context, the term "configured" means arranged, structured, and/or programmed. For example, in the context of processor circuitry configured to perform a specified operation, the processor circuitry is arranged, structured, and/or programmed (e.g., based on machine-readable instructions) to perform the specified operation.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

FIG. 1 is a block diagram of an example pellet grill 100 constructed in accordance with the teachings of this disclosure. The pellet grill 100 of FIG. 1 includes an example control system 102 configured to control manage, perform, carry out, and/or otherwise implement one or more selectable manual cook mode(s). In the illustrated example of FIG. 1, the control system 102 and/or, more generally, the pellet grill 100 includes an example DC power supply 104, an example engine 106 (e.g., including an example auger motor 108, an example fan motor 110, and an example ignitor 112), one or more example sensor(s) 114, an example user interface 116 (e.g., including one or more example input device(s) 118 and one or more example output device(s) 120), an example network interface 122 (e.g., including one or more example communication device(s) 124), an example controller 126 (e.g., including example mode selection circuitry 128, example PID mode settings selection circuitry 130, example PID mode control circuitry 132, example manual mode settings selection circuitry 134, and example manual mode control circuitry 136), and example memory 138. In other examples, one or more of the aforementioned components of FIG. 1 can be omitted from the control system 102 of the pellet grill 100. In still other examples, the control system 102 of the pellet grill 100 can include one or more other component(s) in addition to, or in lieu of the aforementioned components of FIG. 1.

The DC power supply 104 of FIG. 1 receives AC power from an example AC line power source 140 (e.g., a wall outlet) to which the DC power supply 104 and/or, more generally, the control system 102 of the pellet grill 100 is electrically connected. The DC power supply 104 converts AC power received from the AC line power source 140 into DC power that can thereafter be supplied to one or more of the engine 106 (e.g., including the auger motor 108, the fan motor 110, and the ignitor 112), the sensor(s) 114, the user interface 116 (e.g., including the input device(s) 118 and the output device(s) 120), the network interface 122 (e.g., including the communication device(s) 124), the controller 126 (e.g., including the mode selection circuitry 128, the PID mode settings selection circuitry 130, the PID mode control circuitry 132, the manual mode settings selection circuitry 134, and the manual mode control circuitry 136), and/or the memory 138 of the control system 102 of the pellet grill 100. In some examples, the distribution of DC power from the DC power supply 104 to any of the aforementioned components of the control system 102 can be controlled and/or managed by the user interface 116 and/or by the controller 126. In other examples, the DC power supply 104 of FIG. 1 can alternatively be implemented by a battery (or a plurality of batteries) dedicated to powering the control system 102 of the pellet grill 100.

The engine 106 of FIG. 1 facilitates the performance of one or more cooking operation(s) within a cooking chamber of the pellet grill 100. In the illustrated example of FIG. 1, the engine 106 includes the auger motor 108, the fan motor 110, and the ignitor 112. The auger motor 108 of the engine 106 controls and/or facilitates the delivery of pellet fuel from a hopper of the pellet grill 100 into a burn pot of the pellet grill 100. In some examples, the auger motor 108 of the engine 106 is implemented as a DC-powered, variable speed motor. The fan motor 110 of the engine 106 controls and/or facilitates delivery of an airflow to the pellet fuel located within the burn pot of the pellet grill 100 to control the rate of combustion of such pellet fuel. In some examples, the fan motor 110 of the engine 106 is implemented as a DC-powered, variable speed motor. The ignitor 112 of the engine 106 controls and/or facilitates the ignition of pellet fuel located within the burn pot of the pellet grill 100. In some examples, the ignitor 112 of the engine 106 is implemented as a DC-powered glow plug.

Figure 2:
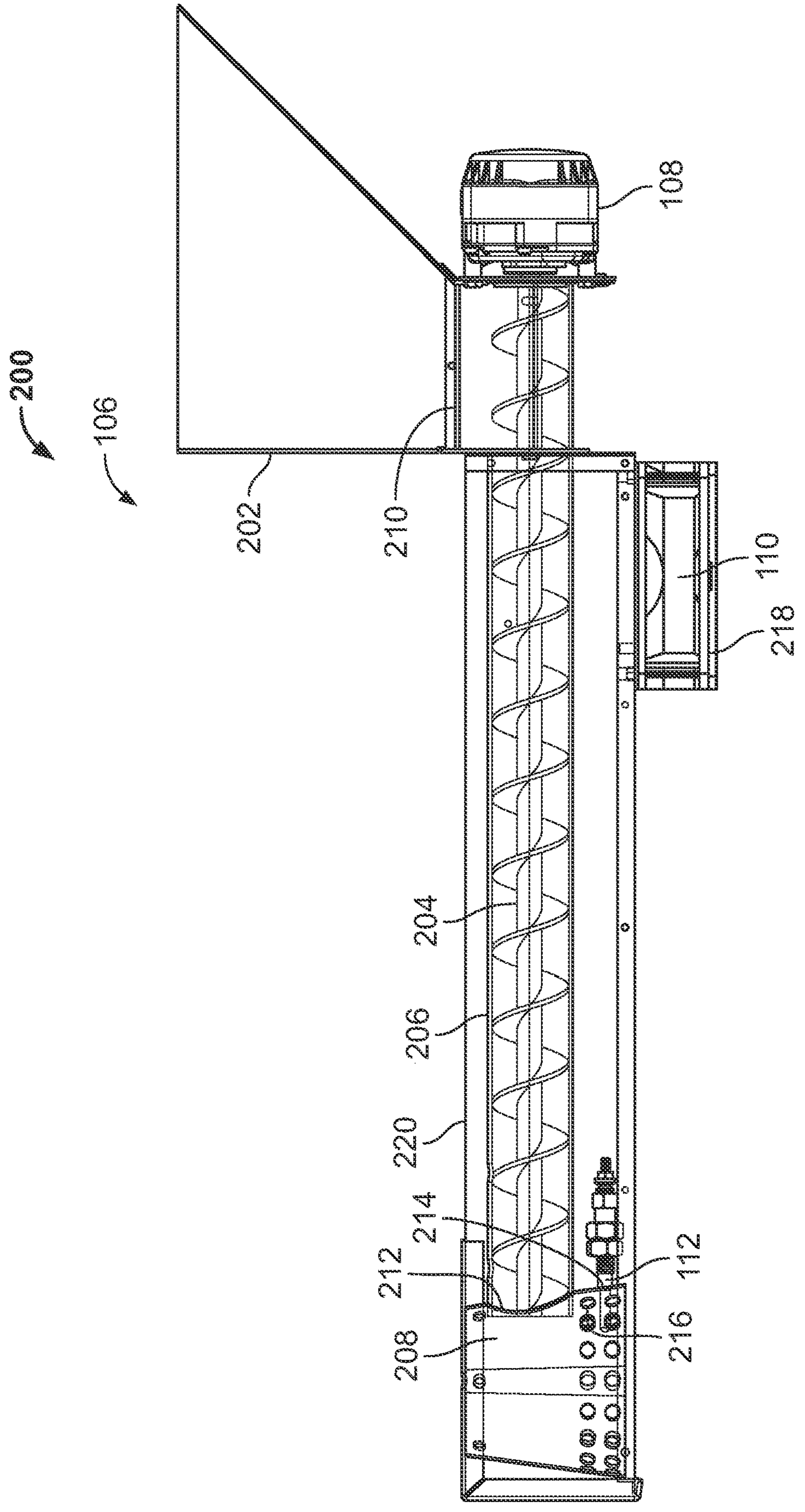
FIG. 2 is an example implementation of the engine of the pellet grill of FIG. 1.

FIG. 2 is an example implementation 200 of the engine 106 of the pellet grill of FIG. 1. The auger motor 108, the fan motor 110, and the ignitor 112 of the engine 106 described above in connection with FIG. 1 are shown in FIG. 2. In the illustrated example of FIG. 2, the engine 106 receives pellet fuel from an example hopper 202 of the pellet grill 100. The engine 106 combusts the received pellet fuel to produce, generate, and/or output heat, which thereafter is distributed throughout a cooking chamber of the pellet grill 100 to cook one or more food item(s) located therein.

In the illustrated example of FIG. 2, the auger motor 108 forms part of and/or is incorporated into an auger assembly that further includes an example auger 204 and an example auger duct 206. The auger duct 206 houses and/or contains the auger 204. The auger 204 is operatively coupled to the auger motor 108 such that operation of the auger motor 108 causes the auger 204 to rotate within the auger duct 206. The auger 204 and/or the auger duct 206 extend(s) from the hopper 202 of the pellet grill 100 to an example burn pot 208 of the engine 106. The hopper 202 holds a volume of pellet fuel to be fed and/or supplied (e.g., via gravity) to the auger 204 and/or the auger duct 206 of the engine 106. In the illustrated example of FIG. 2, the auger duct 206, along with housing and/or containing a portion of the auger 204, is also configured to house and/or contain pellet fuel to be fed and/or supplied by the auger 204 from an example feed duct 210 of the hopper 202 to the burn pot 208 of the engine 106. The auger 204 is configured to move pellet fuel received within the auger duct 206 either towards (e.g., during a cooking operation) or away from (e.g., in response to a jam of the auger 204, and/or during an end-of-cook purge of the pellet fuel) the burn pot 208 of the engine 106. Movement of the auger 204 (e.g., the direction of rotation, rate of rotation, and/or duty cycle of the auger 204) is controlled via the auger motor 108 of the engine 106.

The burn pot 208 of FIG. 2 is configured to contain pellet fuel that is to be combusted, is being combusted, and/or is burning within the burn pot 208. The burn pot 208 is further configured to direct heat produced, generated, and/or output as a byproduct of the pellet fuel combustion and/or burning upwardly (e.g., via an opening formed in the top of the burn pot 208), and to direct ash produced and/or generated as a byproduct of the pellet fuel combustion and/or burning downwardly (e.g., via one or more opening(s) formed in the bottom of the burn pot 208). In the illustrated example of FIG. 2, the burn pot 208 includes a first example opening 212 formed in a sidewall of the burn pot 208 and configured to receive an open end of the auger duct 206. The first opening 212 formed in the sidewall of the burn pot 208 facilitates the delivery of pellet fuel from the auger 204 and/or the auger duct 206 into the burn pot 208. The burn pot 208 of FIG. 2 further includes a second example opening 214 formed in the sidewall of the burn pot 208 and configured to receive an end (e.g., a heat-generating end) of the ignitor 112. The second opening 214 formed in the sidewall of the burn pot 208 facilitates placing the heat-generating end of the ignitor 112 into contact with pellet fuel contained within the burn pot 208. The ignitor 112 can be activated to produce, generate, and/or output heat that causes pellet fuel positioned and/or located within the burn pot 208 to ignite and/or commence combustion. The burn pot 208 of FIG. 2 further includes third example openings 216 formed in the sidewall of the burn pot 208 and configured to receive an airflow generated by an example fan 218 of the engine 106. The fan 218 of FIG. 2 includes the fan motor 110, with movement of the blade(s) of the fan 218 (e.g., the direction of rotation, rate of rotation, and/or duty cycle of the fan 218) being controlled via the fan motor 110.

In the illustrated example of FIG. 2, the auger 204, the auger duct 206, the burn pot 208, and the ignitor 112 are located at least partially within an example housing 220 of the engine 106. The fan 218 of FIG. 2 is mounted and/or coupled to the housing 220 of FIG. 2 along the bottom wall of the housing 220. An airflow generated by the fan 218 (e.g., via one or more blade(s) of the fan 218 rotated by the fan motor 110) passes through an opening formed in the bottom wall of the housing 220, and into a first end of the housing 220 located proximate the hopper 202. The airflow is thereafter directed from the first end of the housing 220 toward a second end of the housing 220 located proximate the burn pot 208. A portion of the airflow traveling through the housing 220 enters the burn pot 208 via the third openings 216 formed in the burn pot 208. Movement of the airflow into the burn pot 208 via the third openings 216 assists in controlling the combustion and/or burning of the pellet fuel within the burn pot 208, and/or assists in controlling the movement of heat produced, generated, and/or output as a byproduct of the pellet fuel combustion and/or burning from the burn pot 208 throughout the cooking chamber of the pellet grill 100.

Returning to the illustrated example of FIG. 1, the sensor(s) 114 of FIG. 1 sense(s), measure(s), and/or detect(s) one or more parameter(s) associated with operating one or more component(s) of the control system 102 to implement one or more cooking operation(s) of the pellet grill 100. In some examples, the sensor(s) 114 include one or more temperature sensor(s) (e.g., one or more thermocouple(s)) configured to sense, measure, and/or detect the temperature of a cooking chamber of the pellet grill 100. In some examples, the sensor(s) 114 include one or more current sensor(s) configured to sense, measure, and/or detect an electrical current (e.g., a load) delivered to and/or drawn by the auger motor 108, the fan motor 110, and/or the ignitor 112 of the engine 106 of the pellet grill 100. In some examples, the sensor(s) 114 include one or more speed sensor(s) (e.g., one or more tachometer(s)) configured to sense, measure, and/or detect a rotational speed of the auger motor 108 and/or the fan motor 110 of the engine 106 of the pellet grill 100. Data, information, and/or signals sensed, measured, and/or detected by the sensor(s) 114 of FIG. 1 may be of any quantity, type, form and/or format. Data, information, and/or signals sensed, measured, and/or detected by the sensor(s) 114 of FIG. 1 can be transmitted directly to the controller 126 of FIG. 1, and/or can be transmitted to and stored in the memory 138 of FIG. 1.

The user interface 116 of FIG. 1 enables a user of the pellet grill 100 to interact with the controller 126 of the control system 102 of FIG. 1. The input device(s) 118 of the user interface 116 permit(s) the user of the pellet grill 100 to enter data, information, selections, inputs, instructions, and/or commands into the controller 126. For example, the input device(s) 118 of the user interface 116 can permit the user of the pellet grill 100 to enter data, information, one or more selection(s), one or more input(s), one or more instruction(s), and/or one or more command(s) into the controller 126 that cause(s) the controller 126 to implement one or more cook mode(s) (e.g., a PID cook mode, or one or more selectable manual cook mode(s)) via the control system 102 of the pellet grill 100. The input device(s) 118 of the user interface 116 can be implemented, for example, by one or more of a touchscreen, a button, a dial, a knob, a switch, an audio sensor, a microphone, an image sensor, a camera, and/or a voice recognition system.

The output device(s) 120 of the user interface 116 facilitate the presentation of data and/or information (e.g., data and/or information generated by the controller 126) to the user of the pellet grill 100. For example, the output device(s) 120 of the user interface 116 can facilitate the presentation (e.g., textually, graphically, and/or audibly) of data and/or information associated with implementing one or more cook mode(s) (e.g., a PID cook mode, or one or more selectable manual cook mode(s)) via the control system 102 of the pellet grill 100. The output device(s) 120 of the user interface 116 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker.

In the illustrated example of FIG. 1, the user interface 116 is operatively coupled to (e.g., in electrical communication with) the controller 126 (e.g., including the mode selection circuitry 128, the PID mode settings selection circuitry 130, the PID mode control circuitry 132, the manual mode settings selection circuitry 134, and the manual mode control circuitry 136) and/or the memory 138 of the control system 102 of the pellet grill 100. In some examples, the user interface 116 is mechanically coupled to (e.g., fixedly connected to) the pellet grill 100. For example, the user interface 116 can be mounted to a cookbox, a lid, a hopper, or a side table of the pellet grill 100. The user interface 116 is preferably mounted to a portion of the pellet grill 100 that is readily accessible to a user of the pellet grill 100, such as a front portion of a cookbox, a front portion of a lid, a front portion of a hopper, or a front portion of a side table of the pellet grill 100. In some examples, respective ones of the input device(s) 118 and/or the output device(s) 120 of the user interface 116 can be mounted to different portions of the pellet grill 100. The architecture and/or operations of the user interface 116 can be distributed among any number of user interfaces respectively having any number of input device(s) 118 and/or output device(s) 120 located at and/or mounted to any portion of the pellet grill 100.

Figure 3:
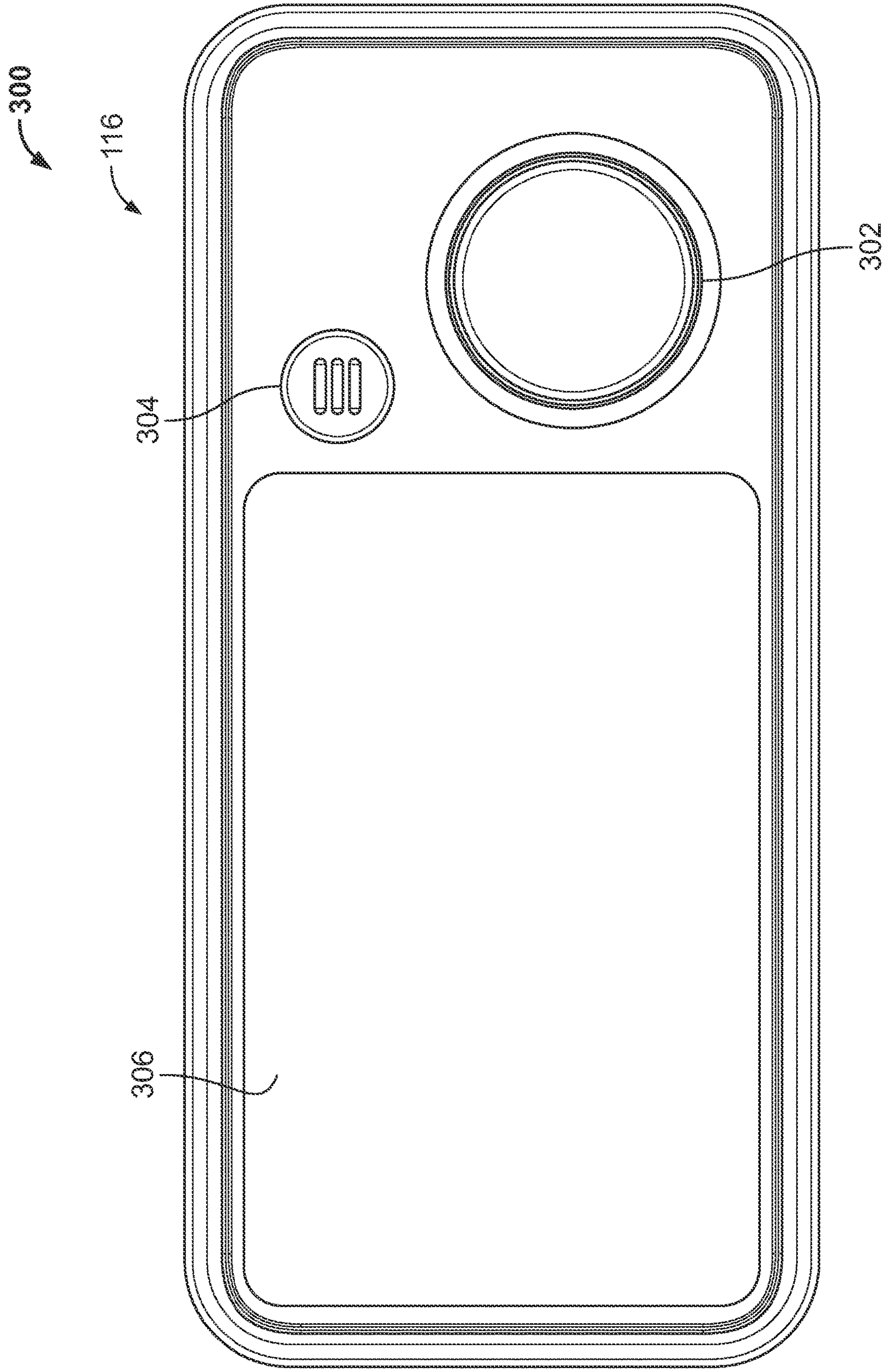
FIG. 3 is an example implementation of the user interface of the pellet grill of FIG. 1.

FIG. 3 includes an example implementation 300 of the user interface 116 of the pellet grill 100 of FIG. 1. As shown in FIG. 3, the user interface 116 includes an example dial 302 and an example button 304 that can be implemented by or as the input device(s) 118 of the user interface 116 of FIG. 1, and an example display 306 that can be implemented by or as the output device(s) 120 of the user interface 116 of FIG. 1. In the illustrated example of FIG. 2, the dial 302 of the user interface 116 is a selection dial that can be rotated by a user of the pellet grill 100 to adjust a temperature setpoint of the pellet grill 100, and/or to navigate through selectable options (e.g., available manual cook modes, and/or available settings associated with each of the available manual cook modes) presented on the display 306 of the user interface 116. In addition to being rotatable, the dial 302 can also be pushed by a user of the pellet grill 100 to make and/or confirm a selection of one of the selectable options presented on the display 306. The button 304 of the user interface 116 is a menu button that can be pressed by a user of the pellet grill 100 to access a main menu (e.g., a "home" menu) of the selectable options, and to cause the main menu to be presented on the display 306 of the user interface 116. The display 306 of the user interface 116 is a liquid crystal display configured to present textual and/or graphical information to a user of the pellet grill 100. In some examples, the display 306 can be implemented as a touchscreen, in which case the display 306 can be implemented not only as one of the output device(s) 120 of the user interface 116, but also as another one of the input device(s) 118 of the user interface 116.

Returning to the illustrated example of FIG. 1, the network interface 122 of FIG. 1 includes one or more communication device(s) 124 (e.g., transmitter(s), receiver(s), transceiver(s), modem(s), gateway(s), wireless access point(s), etc.) to facilitate the exchange of data with external machines (e.g., computing devices of any kind, including the remote device(s) 142 of FIG. 1) by a wired or wireless communication network. Communications transmitted and/or received via the communication device(s) 124 and/or, more generally, via the network interface 122 can be made over and/or carried by, for example, an Ethernet connection, a digital subscriber line (DSL) connection, a telephone line connection, a coaxial cable system, a satellite system, a wireless system, a cellular telephone system, an optical connection, etc. The network interface 122 enables a user of the pellet grill 100 to remotely interact (e.g., via one or more of the remote device(s) 142) with the above-described control system 102 of the pellet grill 100. In the illustrated example of FIG. 1, the network interface 122 is operatively coupled to (e.g., in electrical communication with) the controller 126 (e.g., including the mode selection circuitry 128, the PID mode settings selection circuitry 130, the PID mode control circuitry 132, the manual mode settings selection circuitry 134, and the manual mode control circuitry 136) and/or the memory 138 of the pellet grill 100.

The controller 126 of FIG. 1 manages and/or controls the control system 102 of the pellet grill 100 and/or the components thereof. In the illustrated example of FIG. 1, the controller 126 is operatively coupled to (e.g., in electrical communication with) one or more of the DC power supply 104, the engine 106 (e.g., including the auger motor 108, the fan motor 110, and the ignitor 112), the sensor(s) 114, the user interface 116 (including the input device(s) 118 and the output device(s) 120), the network interface 122 (including the communication device(s) 124), and/or the memory 138 of the control system 102 of the pellet grill 100. The controller 126 of FIG. 1 is also operatively coupled to (e.g., in wired or wireless electrical communication with) the remote device(s) 142 of FIG. 1 via the network interface 122 (e.g., including the communication device(s) 124) of the pellet grill 100 of FIG. 1. In the illustrated example of FIG. 1, the controller 126 includes the mode selection circuitry 128, the PID mode settings selection circuitry 130, the PID mode control circuitry 132, the manual mode settings selection circuitry 134, and the manual mode control circuitry 136 of FIG. 1, each of which is discussed in further detail herein. The mode selection circuitry 128, the PID mode settings selection circuitry 130, the PID mode control circuitry 132, the manual mode settings selection circuitry 134, the manual mode control circuitry 136, and/or, more generally, the controller 126 of FIG. 1 can individually and/or collectively be implemented by any type(s) and/or any number(s) of semiconductor device(s) (e.g., processor(s), microprocessor(s), microcontroller(s), etc.) and/or circuit(s).

In the illustrated example of FIG. 1, the controller 126 is graphically represented as a single, discrete structure that manages and/or controls the operation(s) of various components of the control system 102 of the pellet grill 100. It is to be understood, however, that in other examples, the architecture and/or operations of the controller 126 can be distributed among any number of controllers, with each separate controller having a dedicated subset of one or more operation(s) described herein. As but one example, the controller 126 of FIG. 1 can be separated into five distinct controllers, whereby a first one of the five controllers includes the mode selection circuitry 128 of the controller 126, a second one of the five controllers includes the PID mode settings selection circuitry 130 of the controller 126, a third one of the five controllers includes the PID mode control circuitry 132 of the controller 126, a fourth one of the five controllers includes the manual mode settings selection circuitry 134 of the controller 126, and a fifth one of the five controllers includes the manual mode control circuitry 136 of the controller 126. In some examples, the pellet grill 100 can further include separate, distinct controllers for one or more of the engine 106 (e.g., including the auger motor 108, the fan motor 110, and the ignitor 112), the user interface 116 (e.g., including the input device(s) 118 and the output device(s) 120), the network interface 122 (e.g., including the communication device(s) 124), and/or the memory 138 of the pellet grill 100 of FIG. 1.

In the illustrated example of FIG. 1, the controller 126 and/or, more generally, the pellet grill 100 is configured to selectively implement a PID cook mode and one or more manual cook mode(s) (e.g., a bounded manual cook mode, a partially-bounded manual cook mode, and/or an unbounded manual cook mode). The PID cook mode is configured to implement a closed-loop (e.g., feedback system) PID-controlled cooking operation. By contrast, each manual cook mode is configured to implement an open-loop (e.g., non-feedback system) manually-controlled cooking operation. The mode selection circuitry 128, the PID mode settings selection circuitry 130, the PID mode control circuitry 132, the manual mode settings selection circuitry 134, and the manual mode control circuitry 136 individually and/or collectively constitute processor circuitry of the controller 126 configured to manage and/or control the selection and/or the implementation of the PID cook mode and/or the manual cook mode(s) of the pellet grill 100.

The mode selection circuitry 128 of the controller 126 of FIG. 1 manages and/or controls the selection of one or more available cook mode(s) (e.g., a PID cook mode, a manual cook mode, etc.) of the pellet grill 100. In this regard, one or more cook mode(s) to be implemented via the controller 126 and/or, more generally, via the control system 102 of the pellet grill 100 can be selected (e.g., by a user of the pellet grill 100) from among a menu, a list, a library, or a database of selectable cook modes that are available for implementation. In some examples, the mode selection circuitry 128 commands the user interface 116 of FIG. 1 to present (e.g., via the output device(s) 120 of the user interface 116) a menu, a list, a library, or a database of selectable options corresponding to the available cook modes, thereby facilitating selection of one of the available cook modes by the end user of the pellet grill 100. In other examples, the mode selection circuitry 128 additionally or alternatively commands the network interface 122 of FIG. 1 to transmit (e.g., via the communication device(s) 124 of the network interface 122) a menu, a list, a library, or a database of selectable options corresponding to the available cook modes to one or more of the remote device(s) 142, thereby facilitating selection of one of the available cook modes by the end user(s) of the remote device(s) 142.

The mode selection circuitry 128 of FIG. 1 determines whether a selection of one of the available cook modes (e.g., a PID cook mode, a manual cook mode, etc.) has been received at the pellet grill 100. In some examples, the mode selection circuitry 128 receives a command, an instruction, and/or a notification via the input device(s) 118 of the user interface 116 of FIG. 1 indicating that a selection of one of the available cook modes has been received at the pellet grill 100. In other examples, the mode selection circuitry 128 receives a command, an instruction, and/or a notification via the communication device(s) 124 of the network interface 122 of FIG. 1 indicating that a selection of one of the available cook modes has been received at the pellet grill 100. In still other examples, a selection of one of the available cook modes received at the pellet grill 100 (e.g., via the input device(s) 118 of the user interface 116, or via the communication device(s) 124 of the network interface 122) is stored by the memory 138 of FIG. 1. In such examples, the mode selection circuitry 128 can access the memory 138 to determine whether the memory 138 includes stored data indicating that a selection of one of the available cook modes has been received at the pellet grill 100.

In instances where the mode selection circuitry 128 of FIG. 1 determines that a cook mode selection has been received at the pellet grill 100, the mode selection circuitry 128 additionally determines whether the received cook mode selection is associated with a PID cook mode of the pellet grill 100, or is instead associated with a manual cook mode of the pellet grill 100. For example, the mode selection circuitry 128 determines that the received cook mode selection is associated with a PID cook mode when contextual data, metadata, and/or signal data included in and/or associated with the received cook mode selection indicates that the received cook mode selection is associated with a PID cook mode. Conversely, the mode selection circuitry 128 determines that the received cook mode selection is associated with a manual cook mode when contextual data, metadata, and/or signal data included in and/or associated with the received cook mode selection indicates that the received cook mode selection is associated with a manual cook mode. In instances where the mode selection circuitry 128 determines that the received cook mode selection is associated with a PID cook mode of the pellet grill 100, the mode selection circuitry 128 invokes the PID mode settings selection circuitry 130 of the controller 126 of FIG. 1, as further described below.

In instances where the mode selection circuitry 128 instead determines that the received cook mode selection is associated with a manual cook mode of the pellet grill 100, the mode selection circuitry 128 additionally manages and/or controls the selection of one or more available manual cook mode type(s) (e.g., a bounded manual cook mode, a partially-bounded manual cook mode, an unbounded manual cook mode, etc.) of the pellet grill 100. In this regard, one or more manual cook mode type(s) to be implemented via the controller 126 and/or, more generally, via the control system 102 of the pellet grill 100 can be selected (e.g., by a user of the pellet grill 100) from among a menu, a list, a library, or a database of selectable manual cook mode types that are available for implementation. In some examples, the mode selection circuitry 128 commands the user interface 116 of FIG. 1 to present (e.g., via the output device(s) 120 of the user interface 116) a menu, a list, a library, or a database of selectable options corresponding to the available manual cook mode types, thereby facilitating selection of one of the available manual cook mode types by the end user of the pellet grill 100. In other examples, the mode selection circuitry 128 additionally or alternatively commands the network interface 122 of FIG. 1 to transmit (e.g., via the communication device(s) 124 of the network interface 122) a menu, a list, a library, or a database of selectable options corresponding to the available manual cook mode types to one or more of the remote device(s) 142, thereby facilitating selection of one of the available manual cook mode types by the end user(s) of the remote device(s) 142.

The mode selection circuitry 128 of FIG. 1 determines whether a selection of one of the available manual cook mode types (e.g., a bounded manual cook mode, a partially-bounded manual cook mode, an unbounded manual cook mode, etc.) has been received at the pellet grill 100. In some examples, the mode selection circuitry 128 receives a command, an instruction, and/or a notification via the input device(s) 118 of the user interface 116 of FIG. 1 indicating that a selection of one of the available manual cook mode types has been received at the pellet grill 100. In other examples, the mode selection circuitry 128 receives a command, an instruction, and/or a notification via the communication device(s) 124 of the network interface 122 of FIG. 1 indicating that a selection of one of the available manual cook mode types has been received at the pellet grill 100. In still other examples, a selection of one of the available manual cook mode types received at the pellet grill 100 (e.g., via the input device(s) 118 of the user interface 116, or via the communication device(s) 124 of the network interface 122) is stored by the memory 138 of FIG. 1. In such examples, the mode selection circuitry 128 can access the memory 138 to determine whether the memory 138 includes stored data indicating that a selection of one of the available manual cook mode types has been received at the pellet grill 100.

In instances where the mode selection circuitry 128 of FIG. 1 determines that a manual cook mode type selection has been received at the pellet grill 100, the mode selection circuitry 128 invokes the manual mode settings selection circuitry 134 of the controller 126 of FIG. 1, as further described below. In some examples, the pellet grill 100 may be configured such that the pellet grill 100 is capable of implementing only a single type of manual cook mode (e.g., only a bounded manual cook mode). In such examples, the above-described operations of the mode selection circuitry 128 with specific regard to managing and/or controlling the selection of the available manual cook mode types can be omitted and/or skipped. In such examples, the type of the selected manual cook mode is predetermined, and can be automatically assigned to the cook mode selection in instances where the selected cook mode option received at the pellet grill 100 is determined to be associated with a manual cook mode rather than with a PID cook mode.

The PID mode settings selection circuitry 130 of the controller 126 of FIG. 1 manages and/or controls the selection of one or more available temperature setpoint(s) associated with the selected PID cook mode. In this regard, one or more temperature setpoint(s) to be implemented via the controller 126 and/or, more generally, via the control system 102 of the pellet grill 100 can be selected (e.g., by a user of the pellet grill 100) from among a menu, a list, a library, or a database of selectable temperature setpoints that are available for implementation. In some examples, the PID mode settings selection circuitry 130 commands the user interface 116 of FIG. 1 to present (e.g., via the output device(s) 120 of the user interface 116) a menu, a list, a library, or a database of selectable options corresponding to the available temperature setpoints associated with the selected PID cook mode, thereby facilitating selection of one of the available temperature setpoints by the end user of the pellet grill 100. In other examples, the PID mode settings selection circuitry 130 additionally or alternatively commands the network interface 122 of FIG. 1 to transmit (e.g., via the communication device(s) 124 of the network interface 122) a menu, a list, a library, or a database of selectable options corresponding to the available temperature setpoints associated with the selected PID cook mode to one or more of the remote device(s) 142, thereby facilitating selection of one of the available temperature setpoints by the end user(s) of the remote device(s) 142.

The PID mode settings selection circuitry 130 of FIG. 1 determines whether a selection of one of the available temperature setpoints associated with the selected PID cook mode has been received at the pellet grill 100. In some examples, the PID mode settings selection circuitry 130 receives a command, an instruction, and/or a notification via the input device(s) 118 of the user interface 116 of FIG. 1 indicating that a selection of one of the available temperature setpoints has been received at the pellet grill 100. In other examples, the PID mode settings selection circuitry 130 receives a command, an instruction, and/or a notification via the communication device(s) 124 of the network interface 122 of FIG. 1 indicating that a selection of one of the available temperature setpoints has been received at the pellet grill 100. In still other examples, a selection of one of the available temperature setpoints received at the pellet grill 100 (e.g., via the input device(s) 118 of the user interface 116, or via the communication device(s) 124 of the network interface 122) is stored by the memory 138 of FIG. 1. In such examples, the PID mode settings selection circuitry 130 can access the memory 138 to determine whether the memory 138 includes stored data indicating that a selection of one of the available temperature setpoints has been received at the pellet grill 100.

In instances where the PID mode settings selection circuitry 130 of FIG. 1 determines that a temperature setpoint selection associated with the selected PID cook mode has been received at the pellet grill 100, the PID mode settings selection circuitry 130 invokes the PID mode control circuitry 132 of the controller 126 of FIG. 1. The PID mode control circuitry 132 of FIG. 1 manages and/or controls the performance of a PID-controlled cooking operation that is based on the selected temperature setpoint associated with the selected PID cook mode. In some examples, the PID mode control circuitry 132 commands the auger 204 (e.g., via the auger motor 108) and/or the fan 218 (e.g., via the fan motor 110) of the pellet grill 100 to perform, implement, and/or execute a closed-loop (e.g., feedback system) PID-controlled cooking operation that is configured to maintain a measured temperature within the cooking chamber of the pellet grill 100 at the selected temperature setpoint associated with the cooking chamber of the pellet grill 100.

In some examples, the PID mode control circuitry 132 additionally commands the auger 204 (e.g., via the auger motor 108) the fan 218 (e.g., via the fan motor 110), and/or the ignitor 112 of the pellet grill 100 to perform, implement, and/or execute a preheating operation. In some examples, the preheating operation includes raising a measured temperature within the cooking chamber of the pellet grill 100 to a threshold temperature level, which can be either above, below, or equal to the selected temperature setpoint associated with the selected PID cook mode.

In some examples, the PID mode control circuitry 132 commands the auger 204 (e.g., via the auger motor 108), the fan 218 (e.g., via the fan motor 110), and/or the ignitor 112 of the pellet grill 100 to perform, implement, and/or execute the preheating operation prior to the PID mode control circuitry 132 commanding the auger 204 (e.g., via the auger motor 108) and/or the fan 218 (e.g., via the fan motor 110) of the pellet grill 100 to perform, implement, and/or execute the PID-controlled cooking operation.

In some examples, the PID mode control circuitry 132 additionally commands the auger 204 (e.g., via the auger motor 108), the fan 218 (e.g., via the fan motor 110), and/or the ignitor 112 of the pellet grill 100 to perform, implement, and/or execute a shutdown operation associated with the selected PID cook mode. In some examples, the shutdown operation includes purging pellet fuel from the auger duct 206 of the engine 106, and/or fully combusting pellet fuel located within the burn pot 208 of the engine 106. In some examples, the PID mode control circuitry 132 commands the auger 204 (e.g., via the auger motor 108), the fan 218 (e.g., via the fan motor 110), and/or the ignitor 112 of the pellet grill 100 to perform, implement, and/or execute the shutdown operation in response to determining that the PID-controlled cooking operation associated with the selected PID cook mode is complete or is to be terminated.

The manual mode settings selection circuitry 134 of the controller 126 of FIG. 1 manages and/or controls the selection of one or more available setting(s) (e.g., one or more available level setting(s), one or more available group setting(s), one or more available auger setting(s), and/or one or more available fan setting(s)) associated with the selected manual cook mode and/or, more specifically, associated with the selected manual cook mode type. In this regard, the manual mode settings selection circuitry 134 of FIG. 1 manages and/or controls the selection of different types of available settings depending upon the specific type (e.g., bounded, partially-bounded, or unbounded) of the manual cook mode that has been selected.

In instances where the mode selection circuitry 128 of FIG. 1 determines that the received manual cook mode type selection is associated with a bounded manual cook mode of the pellet grill 100, the manual mode settings selection circuitry 134 of FIG. 1 manages and/or controls the selection of one or more available level setting(s) associated with the selected bounded manual cook mode. In this regard, one or more level setting(s) to be implemented via the controller 126 and/or, more generally, via the control system 102 of the pellet grill 100 can be selected (e.g., by a user of the pellet grill 100) from among a menu, a list, a library, or a database of selectable level settings that are available for implementation based on the selected bounded manual cook mode. In some examples, the manual mode settings selection circuitry 134 commands the user interface 116 of FIG. 1 to present (e.g., via the output device(s) 120 of the user interface 116) a menu, a list, a library, or a database of selectable options corresponding to the available level settings associated with the selected bounded manual cook mode, thereby facilitating selection of one of the available level settings by the end user of the pellet grill 100. In other examples, the manual mode settings selection circuitry 134 additionally or alternatively commands the network interface 122 of FIG. 1 to transmit (e.g., via the communication device(s) 124 of the network interface 122) a menu, a list, a library, or a database of selectable options corresponding to the available level settings associated with the selected bounded manual cook mode to one or more of the remote device(s) 142, thereby facilitating selection of one of the available level settings by the end user(s) of the remote device(s) 142.

In some examples, the manual mode settings selection circuitry 134 determines the available level settings associated with the selected bounded manual cook mode based on the content of a settings selection table for the selected bounded manual cook mode. For example, FIG. 4 is a graphical representation of an example settings selection table 400 for a bounded manual cook mode to be implemented by the pellet grill 100 of FIG. 1. The settings selection table 400 of FIG. 4 includes example level settings 402 that are available for selection in association with implementing the bounded manual cook mode. In the illustrated example of FIG. 4, the settings selection table 400 includes thirteen (13) available level settings 402. In other examples, the settings selection table 400 can instead include a different number (e.g., more or less than thirteen (13)) of available level settings 402.

The manual mode settings selection circuitry 134 of FIG. 1 determines whether a selection of one of the available level settings associated with the selected bounded manual cook mode has been received at the pellet grill 100. In some examples, the manual mode settings selection circuitry 134 receives a command, an instruction, and/or a notification via the input device(s) 118 of the user interface 116 of FIG. 1 indicating that a selection of one of the available level settings has been received at the pellet grill 100. In other examples, the manual mode settings selection circuitry 134 receives a command, an instruction, and/or a notification via the communication device(s) 124 of the network interface 122 of FIG. 1 indicating that a selection of one of the available level settings has been received at the pellet grill 100. In still other examples, a selection of one of the available level settings received at the pellet grill 100 (e.g., via the input device(s) 118 of the user interface 116, or via the communication device(s) 124 of the network interface 122) is stored by the memory 138 of FIG. 1. In such examples, the manual mode settings selection circuitry 134 can access the memory 138 to determine whether the memory 138 includes stored data indicating that a selection of one of the available level settings has been received at the pellet grill 100.

The manual mode settings selection circuitry 134 of FIG. 1 also manages and/or controls the determination of an auger setting and a fan setting associated with the selected level setting of the bounded manual cook mode. In some examples, the manual mode settings selection circuitry 134 determines the auger setting and the fan setting associated with the selected level setting of the bounded manual cook mode based on the content of a settings selection table for the selected bounded manual cook mode. For example, in addition to including the level settings 402 discussed above, the settings selection table 400 of FIG. 4 further includes example auger settings 404 (e.g., predetermined constants) associated with the auger 204 and example fan settings 406 (e.g., predetermined constants) associated with the fan 218.

In the illustrated example of FIG. 4, each level setting 402 included in the settings selection table 400 is correlated with a corresponding one of the auger settings 404 and a corresponding one of the fan settings 406. Selection of one of the available level settings 402 from the settings selection table 400 mandates, dictates, governs, and/or otherwise controls the selection of the corresponding one (e.g., existing in the same data row of the settings selection table 400) of the auger settings 404 and the corresponding one (e.g., existing in the same data row of the settings selection table 400) of the fan settings 406. In this regard, an example selection 408 of the "LEVEL 2" level setting 402 from the settings selection table 400 of FIG. 4 determines, causes, and/or otherwise results in an auger setting 404 that is equal to "87 PWM" and a fan setting 406 that is equal to "145 PWM." The determined auger setting 404 (e.g., "87 PWM") and the determined fan setting 406 (e.g., "145 PWM") are accordingly both based on the selected level setting 402 (e.g., "LEVEL 2"). The settings selection table 400 of FIG. 4 can be accessed (e.g., from the memory 138) by the manual mode settings selection circuitry 134 of the controller 126 of FIG. 1 in connection with the manual mode settings selection circuitry 134 determining an auger setting and a fan setting associated with the selected level setting of the bounded manual cook mode. In instances where the manual mode settings selection circuitry 134 of FIG. 1 determines the auger setting and determines the fan setting associated with the selected level setting of the bounded manual control mode, the manual mode settings selection circuitry 134 invokes the manual mode control circuitry 136 of the controller 126 of FIG. 1, as further described below.

In instances where the mode selection circuitry 128 of FIG. 1 determines that the received manual cook mode type selection is associated with a partially-bounded manual cook mode of the pellet grill 100, the manual mode settings selection circuitry 134 of FIG. 1 manages and/or controls the selection of one or more available group setting(s) associated with the selected partially-bounded manual cook mode. In this regard, one or more group setting(s) to be implemented via the controller 126 and/or, more generally, via the control system 102 of the pellet grill 100 can be selected (e.g., by a user of the pellet grill 100) from among a menu, a list, a library, or a database of selectable group settings that are available for implementation based on the selected partially-bounded manual cook mode. In some examples, the manual mode settings selection circuitry 134 commands the user interface 116 of FIG. 1 to present (e.g., via the output device(s) 120 of the user interface 116) a menu, a list, a library, or a database of selectable options corresponding to the available group settings associated with the selected partially-bounded manual cook mode, thereby facilitating selection of one of the available group settings by the end user of the pellet grill 100. In other examples, the manual mode settings selection circuitry 134 additionally or alternatively commands the network interface 122 of FIG. 1 to transmit (e.g., via the communication device(s) 124 of the network interface 122) a menu, a list, a library, or a database of selectable options corresponding to the available group settings associated with the selected partially-bounded manual cook mode to one or more of the remote device(s) 142, thereby facilitating selection of one of the available group settings by the end user(s) of the remote device(s) 142.

In some examples, the manual mode settings selection circuitry 134 determines the available group settings associated with the selected partially-bounded manual cook mode based on the content of a settings selection table for the selected partially-bounded manual cook mode. For example, FIG. 5 is a graphical representation of an example settings selection table 500 for a partially-bounded manual cook mode to be implemented by the pellet grill 100 of FIG. 1. The settings selection table 500 of FIG. 5 includes example group settings 502 that are available for selection in association with implementing the partially-bounded manual cook mode. In the illustrated example of FIG. 5, the settings selection table 500 includes four (4) available group settings 502. In other examples, the settings selection table 500 can instead include a different number (e.g., more or less than four (4)) of available group settings 502.

The manual mode settings selection circuitry 134 of FIG. 1 determines whether a selection of one of the available group settings associated with the selected partially-bounded manual cook mode has been received at the pellet grill 100. In some examples, the manual mode settings selection circuitry 134 receives a command, an instruction, and/or a notification via the input device(s) 118 of the user interface 116 of FIG. 1 indicating that a selection of one of the available group settings has been received at the pellet grill 100. In other examples, the manual mode settings selection circuitry 134 receives a command, an instruction, and/or a notification via the communication device(s) 124 of the network interface 122 of FIG. 1 indicating that a selection of one of the available group settings has been received at the pellet grill 100. In still other examples, a selection of one of the available group settings received at the pellet grill 100 (e.g., via the input device(s) 118 of the user interface 116, or via the communication device(s) 124 of the network interface 122) is stored by the memory 138 of FIG. 1. In such examples, the manual mode settings selection circuitry 134 can access the memory 138 to determine whether the memory 138 includes stored data indicating that a selection of one of the available group settings has been received at the pellet grill 100.

The manual mode settings selection circuitry 134 of FIG. 1 manages and/or controls the selection of one or more available auger setting(s) (e.g., associated with the auger 204) and one or more available fan setting(s) (e.g., associated with the fan 218) associated with the selected group setting of the selected partially-bound manual cook mode. In this regard, one or more available auger setting(s) and one or more available fan setting(s) to be implemented via the controller 126 and/or, more generally, via the control system 102 of the pellet grill 100 can be selected (e.g., by a user of the pellet grill 100) from among a menu, a list, a library, or a database of selectable auger settings and selectable fan settings that are available for implementation based on the selected group setting of the selected partially-bounded manual cook mode. In some examples, the manual mode settings selection circuitry 134 commands the user interface 116 of FIG. 1 to present (e.g., via the output device(s) 120 of the user interface 116) a menu, a list, a library, or a database of selectable options corresponding to the available auger settings and the available fan settings associated with the selected group setting of the selected partially-bounded manual cook mode, thereby facilitating selection of one of the available auger settings and one of the available fan settings by the end user of the pellet grill 100. In other examples, the manual mode settings selection circuitry 134 additionally or alternatively commands the network interface 122 of FIG. 1 to transmit (e.g., via the communication device(s) 124 of the network interface 122) a menu, a list, a library, or a database of selectable options corresponding to the available auger settings and the available fan settings associated with the selected group setting of the selected partially-bounded manual cook mode to one or more of the remote device(s) 142, thereby facilitating selection of one of the available auger settings and one of the available fan settings by the end user(s) of the remote device(s) 142.

In some examples, the manual mode settings selection circuitry 134 determines the available auger settings and the available fan settings associated with the selected group setting of the partially-bounded manual cook mode based on the content of a settings selection table for the selected partially-bounded manual cook mode. For example, in addition to including the group settings 502 discussed above, the settings selection table 500 of FIG. 5 further includes example auger settings 504 associated with the auger 204 and example fan settings 506 associated with the fan 218 that are available for selection in association with implementing the partially-bounded manual cook mode.

In the illustrated example of FIG. 5, each group setting 502 included in the settings selection table 500 is correlated with a corresponding range of the auger settings 504 and a corresponding range of the fan settings 506. Selection of one of the available group settings 502 from the settings selection table 500 mandates, dictates, governs, and/or otherwise controls the selection of the corresponding range (e.g., existing in the same data row of the settings selection table 500) of the auger settings 504 and the corresponding range (e.g., existing in the same data row of the settings selection table 400) of the fan settings 406. In this regard, an example selection 508 of the "GROUP 2" group setting 502 from the settings selection table 500 of FIG. 5 determines, causes, and/or otherwise results in an available range of auger settings 504 that is equal to "0-25%" and an available range of fan settings 506 that is equal to "26-50%." The determined available range of auger settings 504 (e.g., "0-25%") and the determined available range of fan settings 506 (e.g., "26-50%") are accordingly both based on the selected group setting 502 (e.g., "GROUP 2"). The settings selection table 500 of FIG. 5 can be accessed (e.g., from the memory 138) by the manual mode settings selection circuitry 134 of the controller 126 of FIG. 1 in connection with the manual mode settings selection circuitry 134 determining the available auger settings and the available fan settings associated with a selected group setting of the partially-bounded manual cook mode.

The manual mode settings selection circuitry 134 of FIG. 1 determines whether a selection of one of the available auger settings and a selection of one of the available fan settings associated with the selected group setting of the selected partially-bounded manual cook mode have been received at the pellet grill 100. In some examples, the manual mode settings selection circuitry 134 receives one or more command(s), one or more instruction(s), and/or one or more notification(s) via the input device(s) 118 of the user interface 116 of FIG. 1 indicating that a selection of one of the available auger settings and a selection of one of the available fan settings have been received at the pellet grill 100. In other examples, the manual mode settings selection circuitry 134 receives one or more command(s), one or more instruction(s), and/or one or more notification(s) via the communication device(s) 124 of the network interface 122 of FIG. 1 indicating that a selection of one of the available auger settings and a selection of one of the available fan settings have been received at the pellet grill 100. In still other examples, a selection of one of the available auger settings and a selection of one of the available fan settings received at the pellet grill 100 (e.g., via the input device(s) 118 of the user interface 116, or via the communication device(s) 124 of the network interface 122) are stored by the memory 138 of FIG. 1. In such examples, the manual mode settings selection circuitry 134 can access the memory 138 to determine whether the memory 138 includes stored data indicating that a selection of one of the available auger settings and a selection of one of the available fan settings have been received at the pellet grill 100. In instances where the manual mode settings selection circuitry 134 of FIG. 1 determines that a selected auger setting and a selected fan setting associated with the selected group setting of the partially-bounded manual control mode have been received at the pellet grill 100, the manual mode settings selection circuitry 134 invokes the manual mode control circuitry 136 of the controller 126 of FIG. 1, as further described below.

In instances where the mode selection circuitry 128 of FIG. 1 determines that the received manual cook mode type selection is associated with an unbounded manual cook mode of the pellet grill 100, the manual mode settings selection circuitry 134 of FIG. 1 manages and/or controls the selection of one or more available auger setting(s) (e.g., associated with the auger 204) and one or more available fan setting(s) (e.g., associated with the fan 218) associated with the selected unbounded manual cook mode. In this regard, one or more available auger setting(s) and one or more available fan setting(s) to be implemented via the controller 126 and/or, more generally, via the control system 102 of the pellet grill 100 can be selected (e.g., by a user of the pellet grill 100) from among a menu, a list, a library, or a database of selectable auger settings and selectable fan settings that are available for implementation based on the selected unbounded manual cook mode. In some examples, the manual mode settings selection circuitry 134 commands the user interface 116 of FIG. 1 to present (e.g., via the output device(s) 120 of the user interface 116) a menu, a list, a library, or a database of selectable options corresponding to the available auger settings and the available fan settings associated with the selected unbounded manual cook mode, thereby facilitating selection of one of the available auger settings and one of the available fan settings by the end user of the pellet grill 100. In other examples, the manual mode settings selection circuitry 134 additionally or alternatively commands the network interface 122 of FIG. 1 to transmit (e.g., via the communication device(s) 124 of the network interface 122) a menu, a list, a library, or a database of selectable options corresponding to the available auger settings and the available fan settings associated with the selected unbounded manual cook mode to one or more of the remote device(s) 142, thereby facilitating selection of one of the available auger settings and one of the available fan settings by the end user(s) of the remote device(s) 142.

In some examples, the manual mode settings selection circuitry 134 determines the available auger settings and the available fan settings associated with the selected unbounded manual cook mode based on the content of a settings selection table for the selected unbounded manual cook mode. For example, FIG. 6 is a graphical representation of an example settings selection table 600 for an unbounded manual cook mode to be implemented by the pellet grill 100 of FIG. 1. The settings selection table 600 includes example auger settings 602 associated with the auger 204 and example fan settings 604 associated with the fan 218 that are available for selection in association with implementing the unbounded manual cook mode. In the illustrated example of FIG. 6, the auger settings 602 that are available for selection cover the full operational range (e.g., 0-100%) of the auger 204, and the fan settings 604 that are available for selection cover the full operational range (e.g., 0-100%) of the fan 218. No correlations exist between the available auger settings 602 and the available fan settings 604. Any combination and/or permutation of a selected one of the available auger settings 602 and a selected one of the available fan settings 604 is accordingly possible. The settings selection table 600 of FIG. 6 can be accessed (e.g., from the memory 138) by the manual mode settings selection circuitry 134 of the controller 126 of FIG. 1 in connection with the manual mode settings selection circuitry 134 determining available auger settings and available fan settings associated with the selected unbounded manual cook mode.

The manual mode settings selection circuitry 134 of FIG. 1 determines whether a selection of one of the available auger settings and a selection of one of the available fan settings associated with the selected unbounded manual cook mode have been received at the pellet grill 100. In some examples, the manual mode settings selection circuitry 134 receives one or more command(s), one or more instruction(s), and/or one or more notification(s) via the input device(s) 118 of the user interface 116 of FIG. 1 indicating that a selection of one of the available auger settings and a selection of one of the available fan settings have been received at the pellet grill 100. In other examples, the manual mode settings selection circuitry 134 receives one or more command(s), one or more instruction(s), and/or one or more notification(s) via the communication device(s) 124 of the network interface 122 of FIG. 1 indicating that a selection of one of the available auger settings and a selection of one of the available fan settings have been received at the pellet grill 100. In still other examples, a selection of one of the available auger settings and a selection of one of the available fan settings received at the pellet grill 100 (e.g., via the input device(s) 118 of the user interface 116, or via the communication device(s) 124 of the network interface 122) are stored by the memory 138 of FIG. 1. In such examples, the manual mode settings selection circuitry 134 can access the memory 138 to determine whether the memory 138 includes stored data indicating that a selection of one of the available auger settings and a selection of one of the available fan settings have been received at the pellet grill 100. In instances where the manual mode settings selection circuitry 134 of FIG. 1 determines that a selected auger setting and a selected fan setting associated with the selected unbounded manual control mode have been received at the pellet grill 100, the manual mode settings selection circuitry 134 invokes the manual mode control circuitry 136 of the controller 126 of FIG. 1, as further described below.

The manual mode control circuitry 136 of FIG. 1 manages and/or controls the performance of a manually-controlled cooking operation that is based on the selected and/or determined auger setting (e.g., associated with the auger 204) and the selected and/or determined fan setting (associated with the fan 218) associated with the selected manual control mode type (e.g., the bounded manual control mode, the partially-bounded manual control mode, or the unbounded manual control mode) of the pellet grill 100. In some examples, the manual mode control circuitry 136 commands the auger 204 (e.g., via the auger motor 108) and/or the fan 218 (e.g., via the fan motor 110) of the pellet grill 100 to perform, implement, and/or execute an open-loop (e.g., non-feedback system) manually-controlled cooking operation that is based on the selected and/or determined auger setting and the selected and/or determined fan setting, as opposed to being based on a temperature setpoint associated with the cooking chamber of the pellet grill 100.

In some examples, the manual mode control circuitry 136 additionally commands the auger 204 (e.g., via the auger motor 108), the fan 218 (e.g., via the fan motor 110), and/or the ignitor 112 of the pellet grill 100 to perform, implement, and/or execute a preheating operation. In some examples, the preheating operation includes raising a measured temperature within the cooking chamber of the pellet grill 100 to a threshold temperature level. In some examples, the manual mode control circuitry 136 commands the auger 204 (e.g., via the auger motor 108) and/or the fan 218 (e.g., via the fan motor 110) of the pellet grill 100 to perform, implement, and/or execute the preheating operation prior to the manual mode control circuitry 136 commanding the auger 204 (e.g., via the auger motor 108), the fan 218 (e.g., via the fan motor 110), and/or the ignitor 112 of the pellet grill 100 to perform, implement, and/or execute the manually-controlled cooking operation.

In some examples, the manual mode control circuitry 136 additionally commands the auger 204 (e.g., via the auger motor 108), the fan 218 (e.g., via the fan motor 110), and/or the ignitor 112 of the pellet grill 100 to perform, implement, and/or execute a shutdown operation associated with the selected manual cook mode. In some examples, the shutdown operation includes purging pellet fuel from the auger duct 206 of the engine 106, and/or fully combusting pellet fuel located within the burn pot 208 of the engine 106. In some examples, the manual mode control circuitry 136 commands the auger 204 (e.g., via the auger motor 108), the fan 218 (e.g., via the fan motor 110), and/or the ignitor 112 of the pellet grill 100 to perform, implement, and/or execute the shutdown operation in response to determining that the manually-controlled cooking operation associated with the selected manual cook mode is complete or is to be terminated.

The controller 126 of FIG. 1 generates one or more error notification(s) (e.g., one or more error code(s)) associated with the occurrence of one or more adverse event(s) and/or characteristic(s) of one or more component(s) and/or operation(s) of the pellet grill 100. For example, the controller 126 can generate one or more of an auger motor failure notification, a fan motor failure notification, an excessive cooking chamber temperature notification, a startup failure notification, a flame out notification, a communication failure notification, and/or a temperature sensor failure notification. The controller 126 instructs, commands, and/or otherwise causes the output device(s) 120 of the user interface 116 of FIG. 1 to present (e.g., display) such error notification(s) (e.g., error code(s)) to an end user of the pellet grill 100.

In some examples, the controller 126 implements the same error notification scheme (e.g., generation of the same set of error codes) regardless of whether the pellet grill 100 is operating in a PID cook mode or in a manual cook mode. For example, the controller 126 can be configured to implement an auger motor failure notification, a fan motor failure notification, an excessive cooking chamber temperature notification, a startup failure notification, a flame out notification, a communication failure notification, an/or a temperature sensor failure notification that is/are generated and/or presented without consideration of whether the pellet grill 100 is operating in a PID cook mode or in a manual cook mode.

In other examples, the controller 126 can instead implement different error notification schemes depending upon whether the pellet grill 100 is operating in a PID cook mode or in a manual cook mode. For example, the controller 126 and/or, more generally, the pellet grill 100 can be configured such that one or more error notification(s) generated by the controller 126 when the pellet grill 100 is operating in a PID cook mode is/are either disabled or modified when the pellet grill 100 is operating in a manual cook mode. In this regard, the controller 126 might generate a first excessive cooking chamber temperature notification (e.g., triggered upon the cooking chamber temperature exceeding a first temperature threshold) when the pellet grill 100 is operating in a PID cook mode. By contrast, when the pellet grill 100 is operating in a manual cook mode, the controller 126 may either disable the first excessive cooking chamber temperature notification entirely, or implement a second excessive cooking chamber temperature notification (e.g., triggered upon the cooking chamber temperature exceeding a second temperature threshold that differs from the first temperature threshold) that is modified relative to the first excessive cooking chamber temperature notification.

In some examples, the controller 126 and/or, more generally, the control system 102 of the pellet grill 100 implements and/or executes an automated cook program that incorporates one or more of the above-described manual cook mode(s). For example, the controller 126 can implement and/or execute a first open-loop, manually-controlled cooking operation associated with a first portion of the automated cook program, and can then (e.g., subsequently in time) implement and/or execute a second open-loop, manually-controlled cooking operation associated with a second portion of the automated cook program, with the second open-loop, manually-controlled cooking operation having different settings (e.g., different level settings, different group settings, different auger settings, and/or different fan settings) than those of the first open-loop, manually-controlled cooking operation. In such an example, the transition from implementation of the first open-loop, manually-controlled cooking operation of the automated cook program to implementation of the second open-loop, manually-controlled cooking operation of the automated cook program may be triggered by one or more timer(s) associated with the automated cook program.

As another example, the controller 126 can implement and/or execute an open-loop, manually-controlled cooking operation associated with a first portion of the automated cook program, and can then (e.g., subsequently in time) implement and/or execute a closed-loop, PID-controlled cooking operation associated with a second portion of the automated cook program. As yet another example, the controller 126 can implement and/or execute a closed-loop, PID-controlled cooking operation associated with a first portion of the automated cook program, and can then (e.g., subsequently in time) implement and/or execute an open-loop, manually-controlled cooking operation associated with a second portion of the automated cook program. In such examples, the transition from implementation of the open-loop, manually-controlled cooking operation of the automated cook program to implementation of the closed-loop, PID-controlled cooking operation of the automated cook program, or vice-versa, may be triggered by one or more timer(s) associated with the automated cook program.

The memory 138 of FIG. 1 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information and/or data stored in the memory 138 of FIG. 1 can be stored in any file and/or data structure format, organization scheme, and/or arrangement.

The memory 138 stores data sensed, measured, detected, generated, determined, computed, calculated, identified, presented, input, output, transmitted, and/or received by, to, and/or from the engine 106 (e.g., including the auger motor 108, the fan motor 110, and the ignitor 112), the sensor(s) 114, the user interface 116 (e.g., including the input device (s) 118 and the output device(s) 120), the network interface 122 (e.g., including the communication device(s) 124), and/or the controller 126 (e.g., including the mode selection circuitry 128, the PID mode settings selection circuitry 130, the PID mode control circuitry 132, the manual mode settings selection circuitry 134, and the manual mode control circuitry 136) of the control system 102 of the pellet grill 100 of FIG. 1. The memory also stores correlation data and/or one or more settings selection table(s) (e.g., the settings selection table 400 of FIG. 4, the settings selection table 500 of FIG. 5, and/or the settings selection table 600 of FIG. 6) accessed by the controller 126 (e.g., including the mode selection circuitry 128, the PID mode settings selection circuitry 130, the PID mode control circuitry 132, the manual mode settings selection circuitry 134, and the manual mode control circuitry 136) of the control system 102 of the pellet grill 100 of FIG. 1. The memory also stores one or more selection(s) (e.g., a cook mode selection, a temperature setpoint selection, a manual cook mode type selection, a level setting selection, a group setting selection, an auger setting selection, and/or a fan setting selection) received via the input device(s) 118 of the user interface 116 or via the communication device(s) 124 of the network interface 122, said selection(s) being associated with implementing one or more selectable manual cook mode(s) for the pellet grill 100. The memory 138 also stores instructions (e.g., computer-readable instructions) and associated data corresponding to one or more protocol(s), process(es), program(s), sequence(s), and/or method(s) described below in connection with FIGS. 7A-7B, 8, 9, and/or 10. The memory 138 of FIG. 1 is accessible to one or more of the engine 106 (e.g., including the auger motor 108, the fan motor 110, and the ignitor 112), the sensor(s) 114, the user interface 116 (e.g., including the input device(s) 118 and the output device(s) 120), the network interface 122 (e.g., including the communication device(s) 124), and/or the controller 126 (e.g., including the mode selection circuitry 128, the PID mode settings selection circuitry 130, the PID mode control circuitry 132, the manual mode settings selection circuitry 134, and the manual mode control circuitry 136) of the control system 102 of the pellet grill 100 of FIG. 1.

The remote device(s) 142 of FIG. 1 can be implemented by any type(s) and/or any number(s) of mobile or stationary computing devices. In this regard, examples of such remote device(s) 142 include a smartphone, a tablet, a laptop, a desktop, a cloud server, a wearable computing device, etc. The remote device(s) 142 of FIG. 1 facilitate a remote (e.g., wired, or wireless) extension of the above-described user interface 116 of the pellet grill 100. In this regard, each remote device 142 includes one or more input device(s) and/or one or more output device(s) that mimic and/or enable a remotely-located version of the above-described functionality of the corresponding input device(s) 118 and/or the corresponding output device(s) 120 of the user interface 116 of the pellet grill 100. Accordingly, one or more input(s), selection(s), instruction(s), and/or command(s) received at the pellet grill 100 (e.g., via the communication device(s) 124 of the network interface 122 of the pellet grill 100) from the remote device(s) 142 can be entered and/or made via the input device(s) of the remote device(s) 142 much in the same way that such input(s), selection(s), instruction(s), and/or command(s) would be entered and/or made via the input device(s) 118 of the user interface 116 of the pellet grill 100. Similarly, one or more notification(s), prompt(s), request(s), and/or confirmation(s) transmitted from the pellet grill 100 (e.g., via the communication device(s) 124 of the network interface 122 of the pellet grill 100) to the remote device(s) 142 can be presented via the output device(s) of the remote device(s) 142 much in the same way that such notification(s), prompt(s), request(s), and/or confirmation(s) would be presented via the output device(s) 120 of the user interface 116 of the pellet grill 100.

While an example manner of implementing the control system 102 and/or, more generally, the pellet grill 100 is illustrated in FIG. 1, one or more of the elements, processes, and/or devices illustrated in FIG. 1 may be combined, divided, re-arranged, omitted, eliminated, and/or implemented in any other way. Further, the example DC power supply 104, the example engine 106 (e.g., including the example auger motor 108, the example fan motor 110, and the example ignitor 112), the example sensor(s) 114, the example user interface 116 (e.g., including the example input device(s) 118 and the example output device(s) 120), the example network interface 122 (e.g., including the example communication device(s) 124), the example controller 126 (e.g., including the example mode selection circuitry 128, the example PID mode settings selection circuitry 130, the example PID mode control circuitry 132, the example manual mode settings selection circuitry 134, and the example manual mode control circuitry 136), the example memory 138, and/or, more generally, the control system 102 of the pellet grill 100 of FIG. 1, may be implemented by hardware alone or by hardware in combination with software and/or firmware. Thus, for example, any of the example DC power supply 104, the example engine 106 (e.g., including the example auger motor 108, the example fan motor 110, and the example ignitor 112), the example sensor(s) 114, the example user interface 116 (e.g., including the example input device(s) 118 and the example output device(s) 120), the example network interface 122 (e.g., including the example communication device(s) 124), the example controller 126 (e.g., including the example mode selection circuitry 128, the example PID mode settings selection circuitry 130, the example PID mode control circuitry 132, the example manual mode settings selection circuitry 134, and the example manual mode control circuitry 136), the example memory 138, and/or, more generally, the control system 102 of the pellet grill 100 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example control system 102 of the pellet grill 100 of FIG. 1 may include one or more elements, processes, and/or devices in addition to, or instead of, those illustrated in FIG. 1, and/or may include more than one of any or all of the illustrated elements, processes, and devices.

Flowcharts representing example machine-readable instructions, which may be executed to configure processor circuitry to implement the pellet grill 100 of FIG. 1, are shown in FIGS. 7A-7B, 8, 9, and/or 10. The machine-readable instructions may be one or more executable program(s) or portion(s) thereof for execution by processor circuitry, such as the processor circuitry 1102 shown in the example processor platform 1100 discussed below in connection with FIG. 11 and/or the example processor circuitry discussed below in connection with FIGS. 12 and/or 13. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program(s) and/or the portion(s) thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although example programs are described with reference to the flowcharts illustrated in FIGS. 7A-7B, 8, 9, and/or 10, many other methods of implementing the example pellet grill 100 of FIG. 1 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine-executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or any other machine. For example, the machine-readable instructions may be stored in multiple parts, which are individually compressed, encrypted, and/or stored on separate computing devices, wherein the parts when decrypted, decompressed, and/or combined form a set of machine-executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or any other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 7A-7B, 8, 9, and/or 10 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable medium" and "non-transitory computer-readable storage medium" are expressly defined to include any type of computer-readable storage device and/or storage disk and to exclude propagating signals and to exclude transmission media.

The terms "including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

Figure 7A:
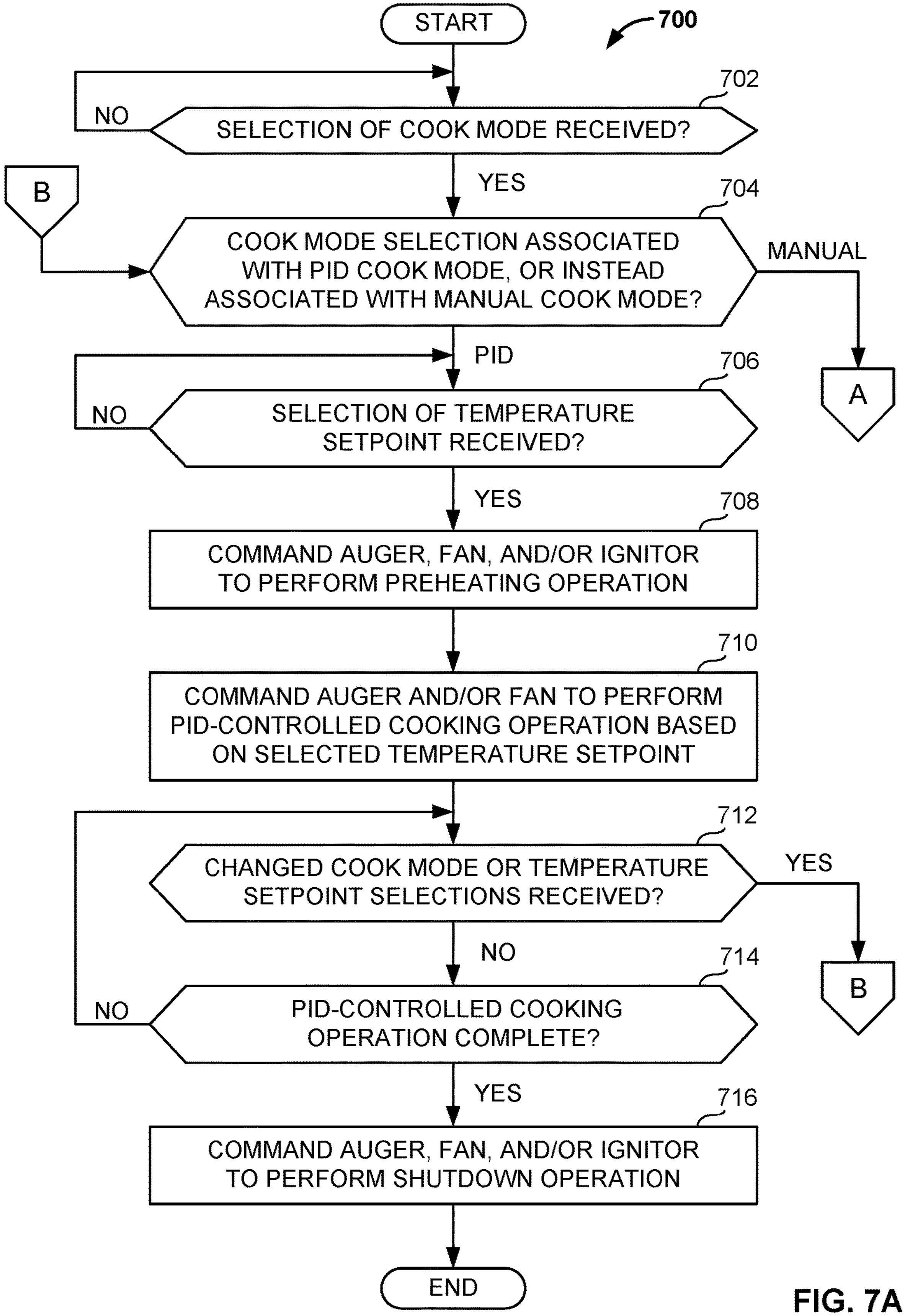
FIGS. 7A-7B are a flowchart representative of example machine-readable instructions and/or example operations that may be executed by processor circuitry to implement one or more cook mode(s) of the pellet grill of FIG. 1.
Figure 7B:
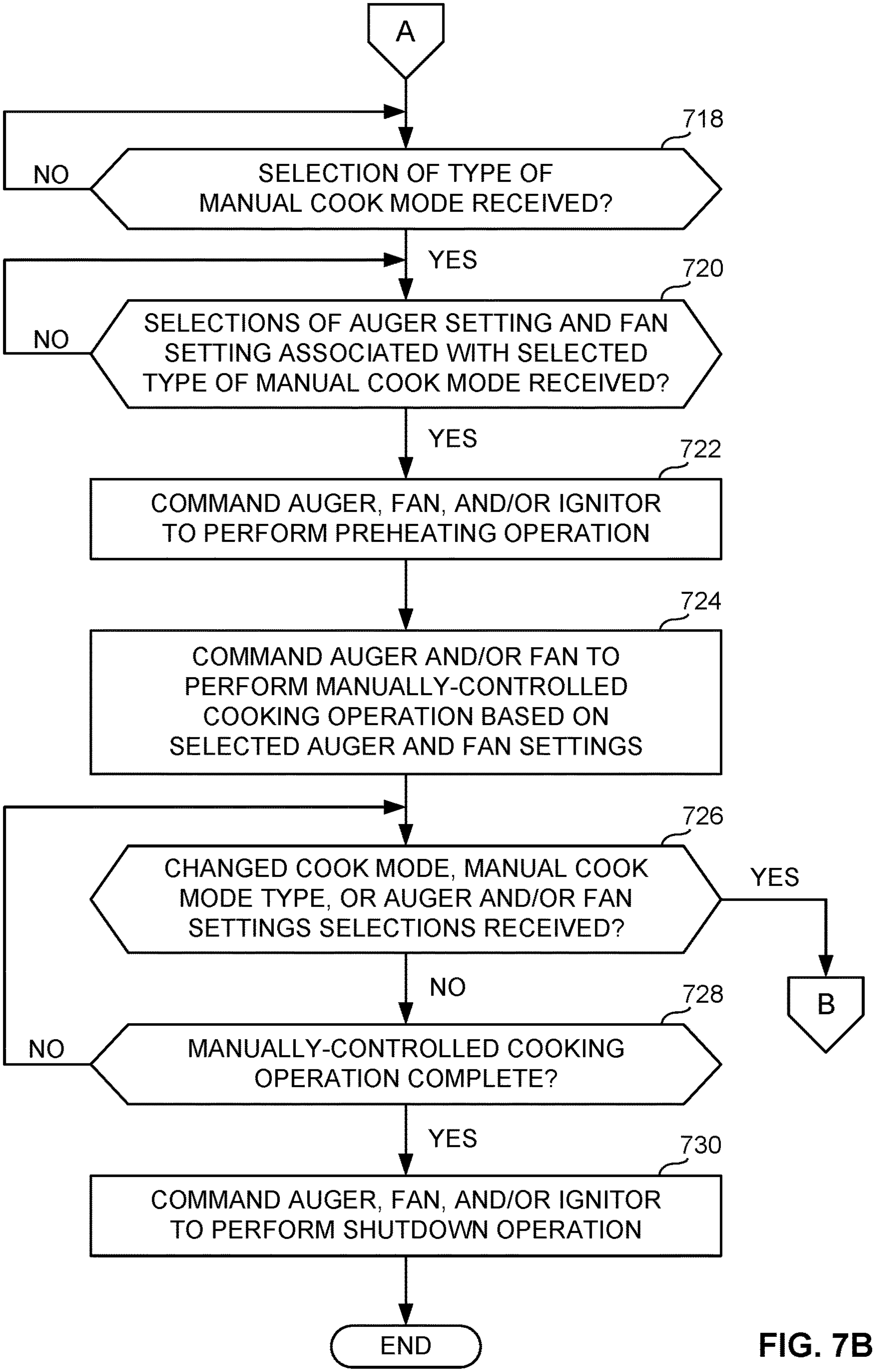

FIGS. 7A-7B are a flowchart representative of example machine-readable instructions and/or example operations 700 that may be executed by processor circuitry (e.g., processor circuitry of the controller 126 of FIG. 1) to implement one or more cook mode(s) of the pellet grill 100 of FIG. 1. The machine-readable instructions and/or operations 700 of FIGS. 7A-7B begin at Block 702 when the mode selection circuitry 128 of the controller 126 of FIG. 1 determines whether a selection of a cook mode for the pellet grill 100 has been received. If the mode selection circuitry 128 determines at Block 702 that a selection of a cook mode for the pellet grill 100 has not been received, control of the machine-readable instructions and/or operations 700 of FIGS. 7A-7B remains at Block 702. If the mode selection circuitry 128 instead determines at Block 702 that a selection of a cook mode for the pellet grill 100 has been received, control of the machine-readable instructions and/or operations 700 of FIGS. 7A-7B proceeds to Block 704.

At Block 704, the mode selection circuitry 128 of the controller 126 of FIG. 1 determines whether the received selection (e.g., the selection from Block 702) is associated with a PID cook mode, or is instead associated with a manual cook mode. For example, the mode selection circuitry 128 determines that the received selection is associated with a PID cook mode when contextual data, metadata, and/or signal data included in and/or associated with the received selection indicates that the received selection is associated with a PID cook mode. Conversely, the mode selection circuitry 128 determines that the received selection is associated with a manual cook mode when contextual data, metadata, and/or signal data included in and/or associated with the received selection indicates that the received selection is associated with a manual cook mode. If the mode selection circuitry 128 determines at Block 704 that the received selection is associated with a PID cook mode, control of the machine-readable instructions and/or operations 700 of FIGS. 7A-7B proceeds to Block 706. If the mode selection circuitry 128 instead determines at Block 704 that the received selection is associated with a manual cook mode, control of the machine-readable instructions and/or operations 700 of FIGS. 7A-7B proceeds to Block 718.

At Block 706, the PID mode settings selection circuitry 130 of the controller 126 of FIG. 1 determines whether a selection of a temperature setpoint has been received. If the PID mode settings selection circuitry 130 determines at Block 706 that a selection of a temperature setpoint has not been received, control of the machine-readable instructions and/or operations 700 of FIGS. 7A-7B remains at Block 706. If the PID mode settings selection circuitry 130 instead determines at Block 706 that a selection of a temperature setpoint has been received, control of the machine-readable instructions and/or operations 700 of FIGS. 7A-7B proceeds to Block 708.

At Block 708, the PID mode control circuitry 132 of the controller 126 of FIG. 1 commands the auger 204 (e.g., via the auger motor 108), the fan 218 (e.g., via the fan motor 110), and/or the ignitor 112 of the engine 106 of the pellet grill 100 to perform a preheating operation. In some examples, performing the preheating operation includes raising a temperature within the cooking chamber of the pellet grill 100 to a threshold temperature level, which can be either above, below, or equal to the selected temperature setpoint. In some examples, Block 708 can be omitted (e.g., performance of the preheating operation can be skipped) in instances where the PID mode control circuitry 132 and/or, more generally, the controller 126 has determined (e.g., via data obtained from the sensor(s) 114 of the pellet grill 100) that the temperature within the cooking chamber of the pellet grill 100 is already elevated to a temperature level consistent with pellet grill 100 having been preheated. Following Block 708, control of the machine-readable instructions and/or operations 700 of FIGS. 7A-7B proceeds to Block 710.

At Block 710, the PID mode control circuitry 132 of the controller 126 of FIG. 1 commands the auger 204 (e.g., via the auger motor 108) and/or the fan 218 (e.g., via the fan motor 110) of the engine 106 of the pellet grill 100 to perform a PID-controlled cooking operation based on the selected temperature setpoint. In some examples, the PID-controlled cooking operation is implemented via a closed-loop control process that receives control feedback based on a measured temperature within a cooking chamber of the pellet grill relative to the selected temperature setpoint. Following Block 710, control of the machine-readable instructions and/or operations 700 of FIGS. 7A-7B proceeds to Block 712.

At Block 712, the mode selection circuitry 128 and/or the PID mode settings selection circuitry 130 of the controller 126 of FIG. 1 determine(s) whether a changed cook mode selection or a changed temperature setpoint selection for the pellet grill 100 has been received. If the mode selection circuitry 128 and/or the PID mode settings selection circuitry 130 determine(s) at Block 712 that either a changed cook mode selection or a changed temperature setpoint selection for the pellet grill 100 has been received, control of the machine-readable instructions and/or operations 700 of FIGS. 7A-7B returns to Block 704. If the mode selection circuitry 128 and/or the PID mode settings selection circuitry 130 instead determine(s) at Block 712 that no changed cook mode selection and no changed temperature setpoint selection for the pellet grill 100 have been received, control of the machine-readable instructions and/or operations 700 of FIGS. 7A-7B proceeds to Block 714.

At Block 714, the PID mode control circuitry 132 of the controller 126 of FIG. 1 determines whether the PID-controlled cooking operation is complete. For example, the PID mode control circuitry 132 and/or, more generally, the controller 126 may receive a command, an instruction, and/or a notification (e.g., via the input device(s) 118 of the user interface 116, or via the communication device(s) 124 of the network interface 122) indicating that the PID-controlled cooking operation is complete and/or that the PID-controlled cooking operation is to be terminated. If the PID mode control circuitry 132 determines at Block 714 that the PID-controlled cooking operation is not complete, control of the machine-readable instructions and/or operations 700 of FIGS. 7A-7B returns to Block 712. If the PID mode control circuitry 132 instead determines at Block 714 that the PID-controlled cooking operation is complete, control of the machine-readable instructions and/or operations 700 of FIGS. 7A-7B proceeds to Block 716.

At Block 716, the PID mode control circuitry 132 of the controller 126 of FIG. 1 commands the auger 204 (e.g., via the auger motor 108), the fan 218 (e.g., via the fan motor 110), and/or the ignitor 112 of the engine 106 of the pellet grill 100 to perform a shutdown operation. In some examples, performing the shutdown operation includes purging pellet fuel from the auger duct 206 of the engine 106, and/or fully combusting pellet fuel located within the burn pot 208 of the engine 106. Following Block 716, the example machine-readable instructions and/or operations 700 of FIGS. 7A-7B end.

At Block 718, the mode selection circuitry 128 of the controller 126 of FIG. 1 determines whether a selection of a type of manual cook mode (e.g., one of a bounded manual cook mode, a partially-bounded manual cook mode, or an unbounded manual cook mode) for the pellet grill 100 has been received. If the mode selection circuitry 128 determines at Block 718 that a selection of a type of manual cook mode for the pellet grill 100 has not been received, control of the machine-readable instructions and/or operations 700 of FIGS. 7A-7B remains at Block 718. If the mode selection circuitry 128 instead determines at Block 718 that a selection of a type of manual cook mode for the pellet grill 100 has been received, control of the machine-readable instructions and/or operations 700 of FIGS. 7A-7B proceeds to Block 720.

At Block 720, the manual mode settings selection circuitry 134 of the controller 126 of FIG. 1 determines whether a selection of an auger setting (e.g., associated with the auger 204) and a selection of a fan setting (e.g., associated with the fan 218) associated with the selected type of manual cook mode have been received and/or determined. If the manual mode settings selection circuitry 134 determines at Block 720 that either a selection of an auger setting or a selection of a fan setting associated with the selected type of manual cook mode has not been received or determined, control of the machine-readable instructions and/or operations 700 of FIGS. 7A-7B remains at Block 720. If the manual mode settings selection circuitry 134 instead determines at Block 720 that a selection of an auger setting and a selection of a fan setting associated with the selected type of manual cook mode for the pellet grill 100 have been received or determined, control of the machine-readable instructions and/or operations 700 of FIGS. 7A-7B proceeds to Block 722.

At Block 722, the manual mode control circuitry 136 of the controller 126 of FIG. 1 commands the auger 204 (e.g., via the auger motor 108), the fan 218 (e.g., via the fan motor 110), and/or the ignitor 112 of the engine 106 of the pellet grill 100 to perform a preheating operation. In some examples, performing the preheating operation includes raising a temperature within the cooking chamber of the pellet grill 100 to a threshold temperature level. In some examples, Block 722 can be omitted (e.g., performance of the preheating operation can be skipped) in instances where the manual mode control circuitry 136 and/or, more generally, the controller 126 has determined (e.g., via data obtained from the sensor(s) 114 of the pellet grill 100) that the temperature within the cooking chamber of the pellet grill 100 is already elevated to a temperature level consistent with pellet grill 100 having been preheated. Following Block 722, control of the machine-readable instructions and/or operations 700 of FIGS. 7A-7B proceeds to Block 724.

At Block 724, the manual mode control circuitry 136 of the controller 126 of FIG. 1 commands the auger 204 (e.g., via the auger motor 108) and/or the fan 218 (e.g., via the fan motor 110) of the engine 106 of the pellet grill 100 to perform a manually-controlled cooking operation based on the selected auger setting and the selected fan setting. Following Block 724, control of the machine-readable instructions and/or operations 700 of FIGS. 7A-7B proceeds to Block 726.

At Block 726, the mode selection circuitry 128 and/or the manual mode settings selection circuitry 134 of the controller 126 of FIG. 1 determine(s) whether a changed cook mode selection, a changed manual cook mode type selection, or a changed auger and/or fan setting selection for the pellet grill 100 has been received. If the mode selection circuitry 128 and/or the manual mode settings selection circuitry 134 determine(s) at Block 726 that either a changed cook mode selection, a changed manual cook mode type selection, a changed auger setting selection, or a changed fan setting selection for the pellet grill 100 has been received, control of the machine-readable instructions and/or operations 700 of FIGS. 7A-7B returns to Block 704. If the mode selection circuitry 128 and/or the manual mode settings selection circuitry 134 instead determine(s) at Block 726 that no changed cook mode selection, no changed manual cook mode type selection, no changed auger setting selection, and no changed fan setting selection for the pellet grill 100 have been received, control of the machine-readable instructions and/or operations 700 of FIGS. 7A-7B proceeds to Block 728.

At Block 728, the manual mode control circuitry 136 of the controller 126 of FIG. 1 determines whether the manually-controlled cooking operation is complete. For example, the manual mode control circuitry 136 and/or, more generally, the controller 126 may receive a command, an instruction, and/or a notification (e.g., via the input device(s) 118 of the user interface 116, or via the communication device(s) 124 of the network interface 122) indicating that the manually-controlled cooking operation is complete and/or that the manually-controlled cooking operation is to be terminated. If the manual mode control circuitry 136 determines at Block 728 that the manually-controlled cooking operation is not complete, control of the machine-readable instructions and/or operations 700 of FIGS. 7A-7B returns to Block 726. If the manual mode control circuitry 136 instead determines at Block 728 that the manually-controlled cooking operation is complete, control of the machine-readable instructions and/or operations 700 of FIGS. 7A-7B proceeds to Block 730.

At Block 730, the manual mode control circuitry 136 of the controller 126 of FIG. 1 commands the auger 204 (e.g., via the auger motor 108), the fan 218 (e.g., via the fan motor 110), and/or the ignitor 112 of the engine 106 of the pellet grill 100 to perform a shutdown operation. In some examples, performing the shutdown operation includes purging pellet fuel from the auger duct 206 of the engine 106, and/or fully combusting pellet fuel located within the burn pot 208 of the engine 106. Following Block 730, the example machine-readable instructions and/or operations 700 of FIGS. 7A-7B end.

Figure 8:
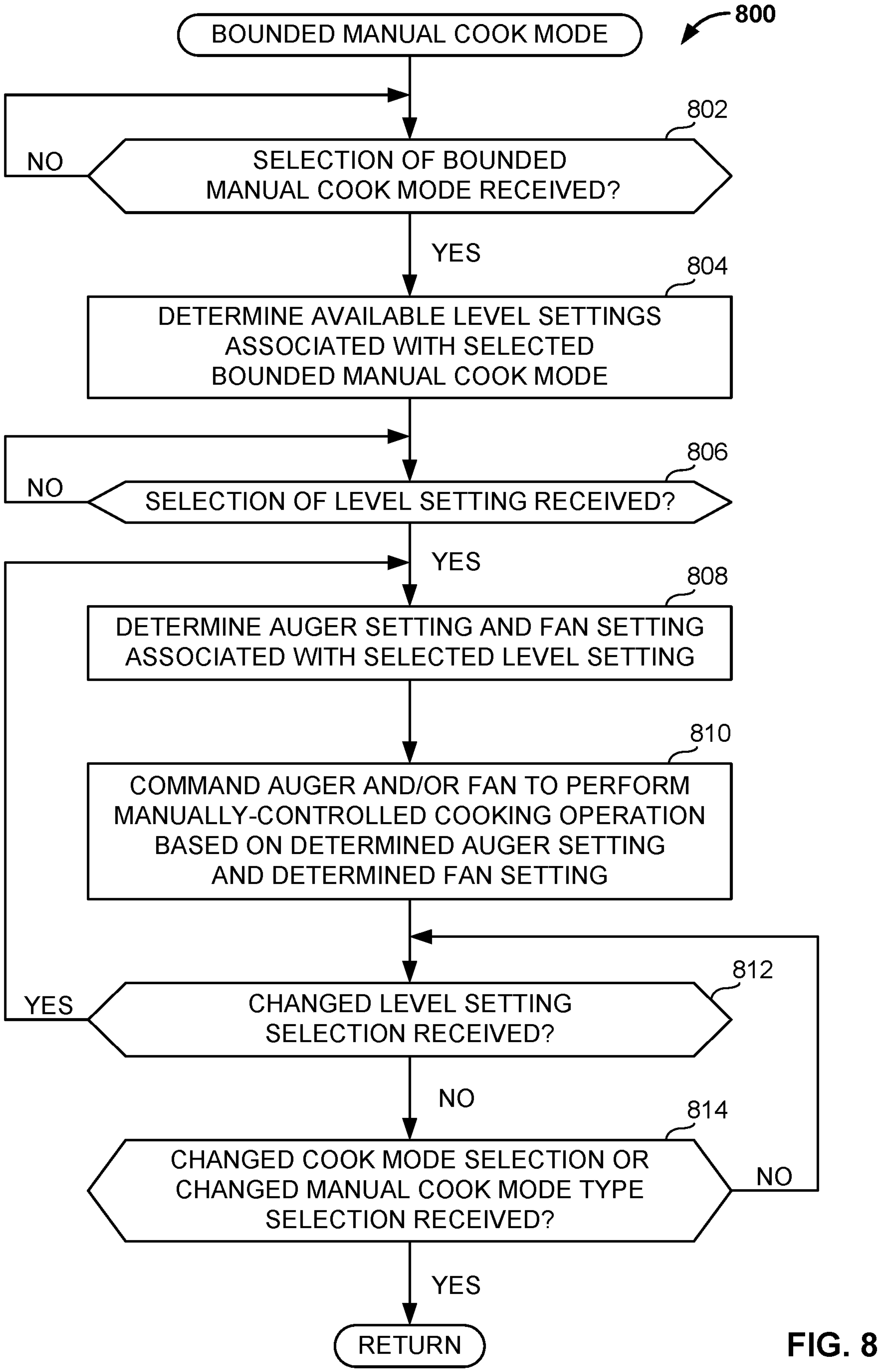
FIG. 8 is a flowchart representative of example machine-readable instructions and/or example operations that may be executed by processor circuitry to implement a bounded manual cook mode of the pellet grill of FIG. 1.

FIG. 8 is a flowchart representative of example machine-readable instructions and/or example operations 800 that may be executed by processor circuitry (e.g., processor circuitry of the controller 126 of FIG. 1) to implement a bounded manual cook mode of the pellet grill 100 of FIG. 1. Example machine-readable instructions and/or operations of Block 802, Block 804, Block 806, Block 808, Block 810, Block 812, and Block 814 of FIG. 8 may be used to implement Block 718, Block 720, Block 724, and Block 726 of FIGS. 7A-7B in instances where the selection of the type of manual cook mode at Block 718 indicates that a bounded manual cook mode has been selected.

The machine-readable instructions and/or operations 800 of FIG. 8 begin at Block 802 when the mode selection circuitry 128 of the controller 126 of FIG. 1 determines whether a selection of a bounded manual cook mode for the pellet grill 100 has been received. If the mode selection circuitry 128 determines at Block 802 that a selection of a bounded manual cook mode for the pellet grill 100 has not been received, control of the machine-readable instructions and/or operations 800 of FIG. 8 remains at Block 802. If the mode selection circuitry 128 instead determines at Block 802 that a selection of a bounded manual cook mode for the pellet grill 100 has been received, control of the machine-readable instructions and/or operations 800 of FIG. 8 proceeds to Block 804.

At Block 804, the manual mode settings selection circuitry 134 of the controller 126 of FIG. 1 determines available level settings associated with the selected bounded manual cook mode. In some examples, the manual mode settings selection circuitry 134 determines the available level settings based on a settings selection table associated with the selected bounded manual cook mode (e.g., the setting selection table 400 of FIG. 4). In some examples, the manual mode settings selection circuitry 134 commands the user interface 116 of FIG. 1 to present the available level settings (e.g., via the output device(s) 120 of the user interface 116) to facilitate selection of one of the available level settings by the end user of the pellet grill 100. In other examples, the manual mode settings selection circuitry 134 additionally or alternatively commands the network interface 122 of FIG. 1 to transmit the available level settings (e.g., via the communication device(s) 124 of the network interface 122) to one or more of the remote device(s) 142 to facilitate selection of one of the available level settings by the end user(s) of the remote device(s) 142. Following Block 804, control of the machine-readable instructions and/or operations 800 of FIG. 8 proceeds to Block 806.

At Block 806, the manual mode settings selection circuitry 134 of the controller 126 of FIG. 1 determines whether a selection of a level setting associated with the bounded manual cook mode has been received. If the manual mode settings selection circuitry 134 determines at Block 806 that a selection of a level setting associated with the bounded manual cook mode has not been received, control of the machine-readable instructions and/or operations 800 of FIG. 8 remains at Block 806. If the manual mode settings selection circuitry 134 instead determines at Block 806 that a selection of a level setting associated with the bounded manual cook mode has been received, control of the machine-readable instructions and/or operations 800 of FIG. 8 proceeds to Block 808.

At Block 808, the manual mode settings selection circuitry 134 of the controller 126 of FIG. 1 determines an auger setting (e.g., associated with the auger 204) and a fan setting (e.g., associated with the fan 218) associated with the selected level setting of the bounded manual cook mode. In some examples, the manual mode settings selection circuitry 134 determines the auger setting and the fan setting based on a settings selection table associated with the selected bounded manual cook mode (e.g., the setting selection table 400 of FIG. 4). Following Block 808, control of the machine-readable instructions and/or operations 800 of FIG. 8 proceeds to Block 810.

At Block 810, the manual mode control circuitry 136 of the controller 126 of FIG. 1 commands the auger 204 (e.g., via the auger motor 108) and/or the fan 218 (e.g., via the fan motor 110) of the engine 106 of the pellet grill 100 to perform a manually-controlled cooking operation based on the determined auger setting and the determined fan setting associated with the selected level setting of the bounded manual cook mode. Following Block 810, control of the machine-readable instructions and/or operations 800 of FIG. 8 proceeds to Block 812.

At Block 812, the manual mode settings selection circuitry 134 of the controller 126 of FIG. 1 determines whether a changed level setting selection associated with the bounded manual cook mode has been received. If the manual mode settings selection circuitry 134 determines at Block 812 that a changed level setting selection associated with the bounded manual cook mode has been received, control of the machine-readable instructions and/or operations 800 of FIG. 8 returns to Block 808. If the manual mode settings selection circuitry 134 instead determines at Block 812 that a changed level setting selection associated with the bounded manual cook mode has not been received, control of the machine-readable instructions and/or operations 800 of FIG. 8 proceeds to Block 814.

At Block 814, the mode selection circuitry 128 of the controller 126 of FIG. 1 determines whether a changed cook mode selection or a changed manual cook mode type selection for the pellet grill 100 has been received. If the mode selection circuitry 128 determines at Block 814 that no changed cook mode selection and no changed manual cook mode type selection for the pellet grill 100 have been received, control of the machine-readable instructions and/or operations 800 of FIG. 8 returns to Block 812. If the mode selection circuitry 128 instead determines at Block 814 that either a changed cook mode selection or a changed manual cook mode type selection for the pellet grill 100 has been received, control of the machine-readable instructions and/or operations 800 of FIG. 8 returns to a function call such as Block 704 of FIGS. 7A-7B.

Figure 9:
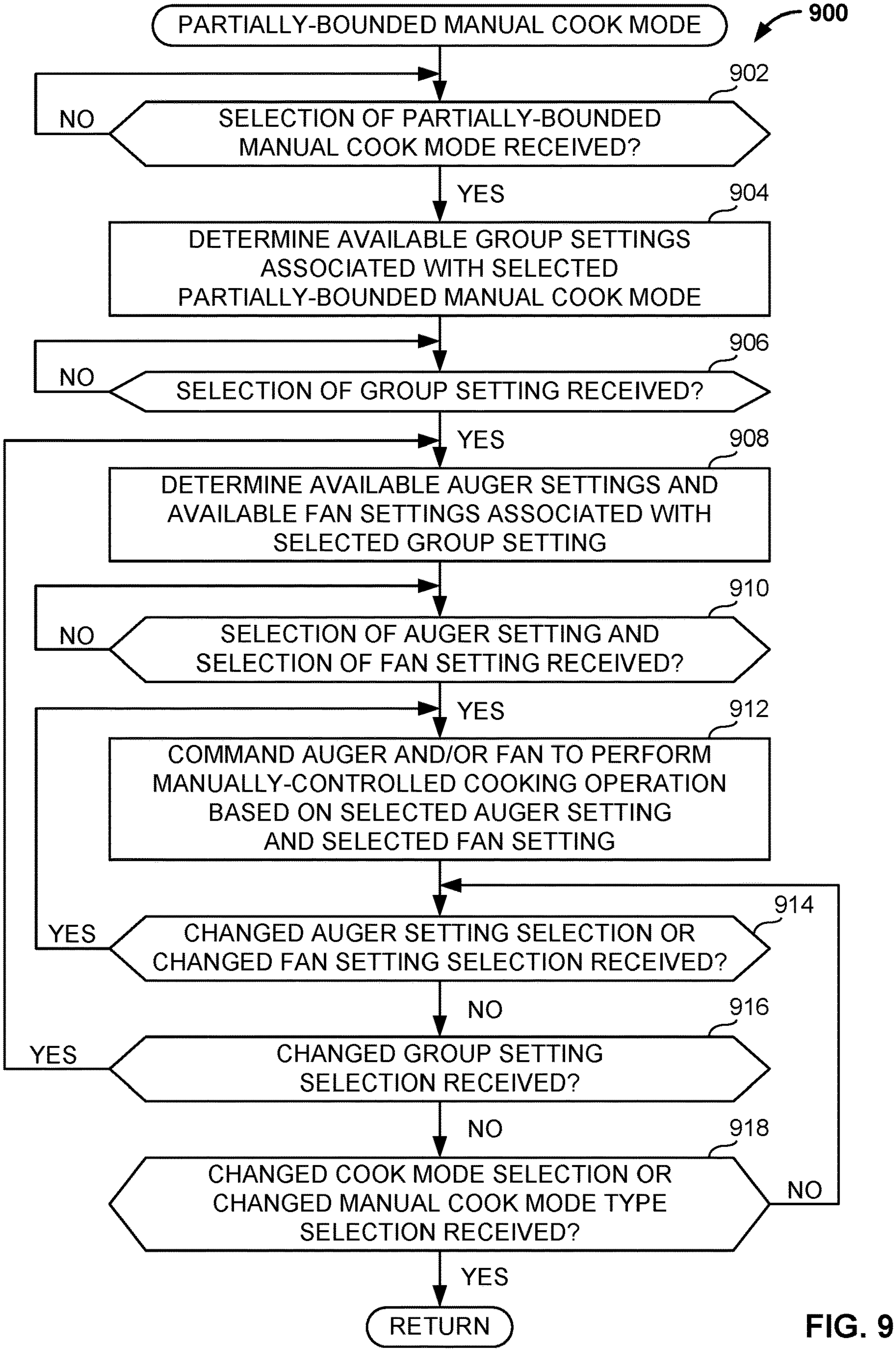
FIG. 9 is a flowchart representative of example machine-readable instructions and/or example operations that may be executed by processor circuitry to implement a partially-bounded manual cook mode of the pellet grill of FIG. 1.

FIG. 9 is a flowchart representative of example machine-readable instructions and/or example operations 900 that may be executed by processor circuitry (e.g., processor circuitry of the controller 126 of FIG. 1) to implement a partially-bounded manual cook mode of the pellet grill 100 of FIG. 1. Example machine-readable instructions and/or operations of Block 902, Block 904, Block 906, Block 908, Block 910, Block 912, Block 914, Block 916, and Block 918 of FIG. 9 may be used to implement Block 718, Block 720, Block 724, and Block 726 of FIGS. 7A-7B in instances where the selection of the type of manual cook mode at Block 718 indicates that a partially-bounded manual cook mode has been selected.

The machine-readable instructions and/or operations 900 of FIG. 9 begin at Block 902 when the mode selection circuitry 128 of the controller 126 of FIG. 1 determines whether a selection of a partially-bounded manual cook mode for the pellet grill 100 has been received. If the mode selection circuitry 128 determines at Block 902 that a selection of a partially-bounded manual cook mode for the pellet grill 100 has not been received, control of the machine-readable instructions and/or operations 900 of FIG. 9 remains at Block 902. If the mode selection circuitry 128 instead determines at Block 902 that a selection of a partially-bounded manual cook mode for the pellet grill 100 has been received, control of the machine-readable instructions and/or operations 900 of FIG. 9 proceeds to Block 904.

At Block 904, the manual mode settings selection circuitry 134 of the controller 126 of FIG. 1 determines available group settings associated with the selected partially-bounded manual cook mode. In some examples, the manual mode settings selection circuitry 134 determines the available group settings based on a settings selection table associated with the selected partially-bounded manual cook mode (e.g., the setting selection table 500 of FIG. 5). In some examples, the manual mode settings selection circuitry 134 commands the user interface 116 of FIG. 1 to present the available group settings (e.g., via the output device(s) 120 of the user interface 116) to facilitate selection of one of the available group settings by the end user of the pellet grill 100. In other examples, the manual mode settings selection circuitry 134 additionally or alternatively commands the network interface 122 of FIG. 1 to transmit the available group settings (e.g., via the communication device(s) 124 of the network interface 122) to one or more of the remote device(s) 142 to facilitate selection of one of the available group settings by the end user(s) of the remote device(s)

142. Following Block 904, control of the machine-readable instructions and/or operations 800 of FIG. 8 proceeds to Block 906.

At Block 906, the manual mode settings selection circuitry 134 of the controller 126 of FIG. 1 determines whether a selection of a group setting associated with the partially-bounded manual cook mode has been received. If the manual mode settings selection circuitry 134 determines at Block 906 that a selection of a group setting associated with the partially-bounded manual cook mode has not been received, control of the machine-readable instructions and/or operations 900 of FIG. 9 remains at Block 906. If the manual mode settings selection circuitry 134 instead determines at Block 906 that a selection of a group setting associated with the partially-bounded manual cook mode has been received, control of the machine-readable instructions and/or operations 900 of FIG. 9 proceeds to Block 908.

At Block 908, the manual mode settings selection circuitry 134 of the controller 126 of FIG. 1 determines available auger settings (e.g., associated with the auger 204) and available fan settings (e.g., associated with the fan 218) associated with the selected group setting of the partially-bounded manual cook mode. In some examples, the manual mode settings selection circuitry 134 determines the available auger settings and the available fan settings based on a settings selection table associated with the selected partially-bounded manual cook mode (e.g., the setting selection table 500 of FIG. 5). In some examples, the manual mode settings selection circuitry 134 commands the user interface 116 of FIG. 1 to present the available auger settings and the available fan settings (e.g., via the output device(s) 120 of the user interface 116) to facilitate selection of one of the available auger settings and one of the available fan settings by the end user of the pellet grill 100. In other examples, the manual mode settings selection circuitry 134 additionally or alternatively commands the network interface 122 of FIG. 1 to transmit the available auger settings and the available fan settings (e.g., via the communication device(s) 124 of the network interface 122) to one or more of the remote device(s) 142 to facilitate selection of one of the available auger settings and one of the available fan settings by the end user(s) of the remote device(s) 142. Following Block 908, control of the machine-readable instructions and/or operations 800 of FIG. 8 proceeds to Block 910.

At Block 910, the manual mode settings selection circuitry 134 of the controller 126 of FIG. 1 determines whether a selection of an auger setting (e.g., associated with the auger 204) and a selection of a fan setting (e.g., associated with the fan 218) associated with the selected group setting of the partially-bounded manual cook mode for the pellet grill 100 have been received. If the manual mode settings selection circuitry 134 determines at Block 910 that either a selection of an auger setting or a selection of a fan setting associated with the selected group setting of the partially-bounded manual cook mode has not been received, control of the machine-readable instructions and/or operations 900 of FIG. 9 remains at Block 910. If the manual mode settings selection circuitry 134 instead determines at Block 910 that a selection of an auger setting and a selection of a fan setting associated with the selected group setting of the partially-bounded manual cook mode have been received, control of the machine-readable instructions and/or operations 900 of FIG. 9 proceeds to Block 912.

At Block 912, the manual mode control circuitry 136 of the controller 126 of FIG. 1 commands the auger 204 (e.g., via the auger motor 108) and/or the fan 218 (e.g., via the fan motor 110) of the engine 106 of the pellet grill 100 to perform a manually-controlled cooking operation based on the selected auger setting and the selected fan setting of the partially-bounded manual cook mode. Following Block 912, control of the machine-readable instructions and/or operations 900 of FIG. 9 proceeds to Block 914.

At Block 914, the manual mode settings selection circuitry 134 of the controller 126 of FIG. 1 determines whether a changed auger setting selection or a changed fan setting selection associated with the selected group setting of the partially-bounded manual cook mode has been received. If the manual mode settings selection circuitry 134 determines at Block 914 that either a changed auger setting selection or a changed fan setting selection associated with the selected group setting of the partially-bounded manual cook mode has been received, control of the machine-readable instructions and/or operations 900 of FIG. 9 returns to Block 912. If the manual mode settings selection circuitry 134 instead determines at Block 914 that no changed auger setting selection and no changed fan setting selection associated with the selected group setting of the partially-bounded manual cook mode have been received, control of the machine-readable instructions and/or operations 900 of FIG. 9 proceeds to Block 916.

At Block 916, the manual mode settings selection circuitry 134 of the controller 126 of FIG. 1 determines whether a changed group setting selection associated with the partially-bounded manual cook mode has been received. If the manual mode settings selection circuitry 134 determines at Block 916 that a changed group setting selection associated with the partially-bounded manual cook mode has been received, control of the machine-readable instructions and/or operations 900 of FIG. 9 returns to Block 908. If the manual mode settings selection circuitry 134 instead determines at Block 916 that a changed group setting selection associated with the partially-bounded manual cook mode has not been received, control of the machine-readable instructions and/or operations 900 of FIG. 9 proceeds to Block 918.

At Block 918, the mode selection circuitry 128 of the controller 126 of FIG. 1 determines whether a changed cook mode selection or a changed manual cook mode type selection for the pellet grill 100 has been received. If the mode selection circuitry 128 determines at Block 918 that no changed cook mode selection and no changed manual cook mode type selection for the pellet grill 100 have been received, control of the machine-readable instructions and/or operations 900 of FIG. 9 returns to Block 914. If the mode selection circuitry 128 instead determines at Block 918 that either a changed cook mode selection or a changed manual cook mode type selection for the pellet grill 100 has been received, control of the machine-readable instructions and/or operations 900 of FIG. 9 returns to a function call such as Block 704 of FIGS. 7A-7B.

Figure 10:
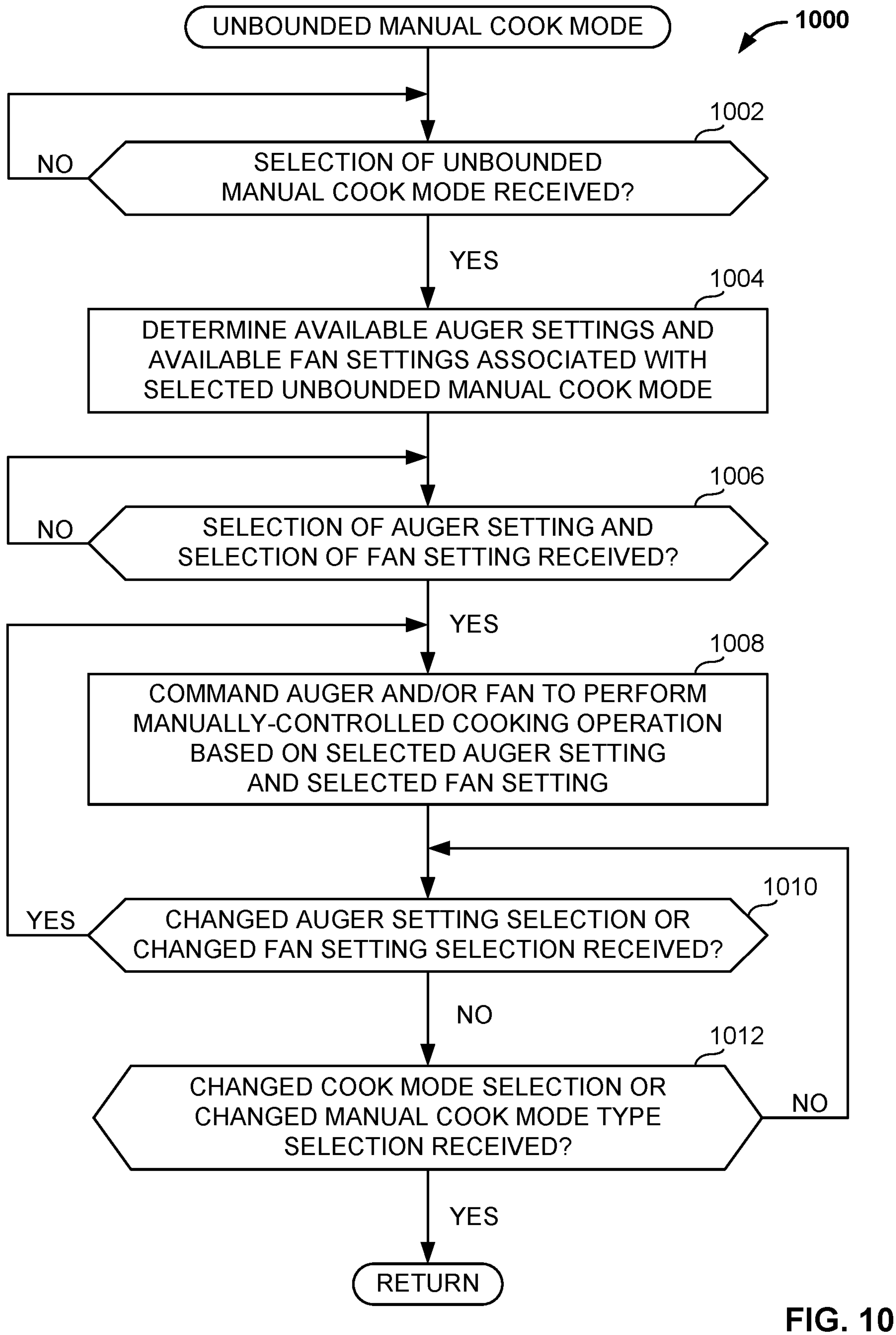
FIG. 10 is a flowchart representative of example machine-readable instructions and/or example operations that may be executed by processor circuitry to implement an unbounded manual cook mode of the pellet grill of FIG. 1.

FIG. 10 is a flowchart representative of example machine-readable instructions and/or example operations 1000 that may be executed by processor circuitry (e.g., processor circuitry of the controller 126 of FIG. 1) to implement an unbounded manual cook mode of the pellet grill 100 of FIG. 1. Example machine-readable instructions and/or operations of Block 1002, Block 1004, Block 1006, Block 1008, Block 1010, and Block 1012 of FIG. 10 may be used to implement Block 718, Block 720, Block 724, and Block 726 of FIGS. 7A-7B in instances where the selection of the type of manual cook mode at Block 718 indicates that an unbounded manual cook mode has been selected.

The machine-readable instructions and/or operations 1000 of FIG. 10 begin at Block 1002 when the mode selection circuitry 128 of the controller 126 of FIG. 1 determines whether a selection of an unbounded manual cook mode for the pellet grill 100 has been received. If the mode selection circuitry 128 determines at Block 1002 that a selection of an unbounded manual cook mode for the pellet grill 100 has not been received, control of the machine-readable instructions and/or operations 1000 of FIG. 10 remains at Block 1002. If the mode selection circuitry 128 instead determines at Block 1002 that a user input indicating selection of an unbounded manual cook mode for the pellet grill 100 has been received, control of the machine-readable instructions and/or operations 1000 of FIG. 10 proceeds to Block 1004.

At Block 1004, the manual mode settings selection circuitry 134 of the controller 126 of FIG. 1 determines available auger settings (e.g., associated with the auger 204) and available fan settings (e.g., associated with the fan 218) associated with the selected unbounded manual cook mode. In some examples, the manual mode settings selection circuitry 134 determines the available auger settings and the available fan settings based on a settings selection table associated with the selected unbounded manual cook mode (e.g., the setting selection table 600 of FIG. 6). In some examples, the manual mode settings selection circuitry 134 commands the user interface 116 of FIG. 1 to present the available auger settings and the available fan settings (e.g., via the output device(s) 120 of the user interface 116) to facilitate selection of one of the available auger settings and one of the available fan settings by the end user of the pellet grill 100. In other examples, the manual mode settings selection circuitry 134 additionally or alternatively commands the network interface 122 of FIG. 1 to transmit the available auger settings and the available fan settings (e.g., via the communication device(s) 124 of the network interface 122) to one or more of the remote device(s) 142 to facilitate selection of one of the available auger settings and one of the available fan settings by the end user(s) of the remote device(s) 142. Following Block 1004, control of the machine-readable instructions and/or operations 1000 of FIG. 10 proceeds to Block 1006.

At Block 1006, the manual mode settings selection circuitry 134 of the controller 126 of FIG. 1 determines whether a selection of an auger setting (e.g., associated with the auger 204) and a selection of a fan setting (e.g., associated with the fan 218) associated with the unbounded manual cook mode have been received. If the manual mode settings selection circuitry 134 determines at Block 1006 that either a selection of an auger setting or a selection of a fan setting associated with the unbounded manual cook mode has not been received, control of the machine-readable instructions and/or operations 1000 of FIG. 10 remains at Block 1006. If the manual mode settings selection circuitry 134 instead determines at Block 1006 that a selection of an auger setting and a selection of a fan setting associated with the unbounded manual cook mode have been received, control of the machine-readable instructions and/or operations 1000 of FIG. 10 proceeds to Block 1008.

At Block 1008, the manual mode control circuitry 136 of the controller 126 of FIG. 1 commands the auger 204 (e.g., via the auger motor 108) and/or the fan 218 (e.g., via the fan motor 110) of the engine 106 of the pellet grill 100 to perform a manually-controlled cooking operation based on the selected auger setting and the selected fan setting of the unbounded manual cook mode. Following Block 1008, control of the machine-readable instructions and/or operations 1000 of FIG. 10 proceeds to Block 1010.

At Block 1010, the manual mode settings selection circuitry 134 of the controller 126 of FIG. 1 determines whether a changed auger setting selection or a changed fan setting selection associated with the unbounded manual cook mode has been received. If the manual mode settings selection circuitry 134 determines at Block 1010 that either a changed auger setting selection or a changed fan setting selection associated with the unbounded manual cook mode has been received, control of the machine-readable instructions and/or operations 1000 of FIG. 10 returns to Block 1008. If the manual mode settings selection circuitry 134 instead determines at Block 1010 that no changed auger setting selection and no changed fan setting selection associated with the unbounded manual cook mode have been received, control of the machine-readable instructions and/or operations 1000 of FIG. 10 proceeds to Block 1012.

At Block 1012, the mode selection circuitry 128 of the controller 126 of FIG. 1 determines whether a changed cook mode selection or a changed manual cook mode type selection for the pellet grill 100 has been received. If the mode selection circuitry 128 determines at Block 1012 that no changed cook mode selection and no changed manual cook mode type selection for the pellet grill 100 have been received, control of the machine-readable instructions and/or operations 1000 of FIG. 10 returns to Block 1010. If the mode selection circuitry 128 instead determines at Block 1012 that either a changed cook mode selection or a changed manual cook mode type selection for the pellet grill 100 has been received, control of the machine-readable instructions and/or operations 1000 of FIG. 10 returns to a function call such as Block 704 of FIGS. 7A-7B.

Figure 11:
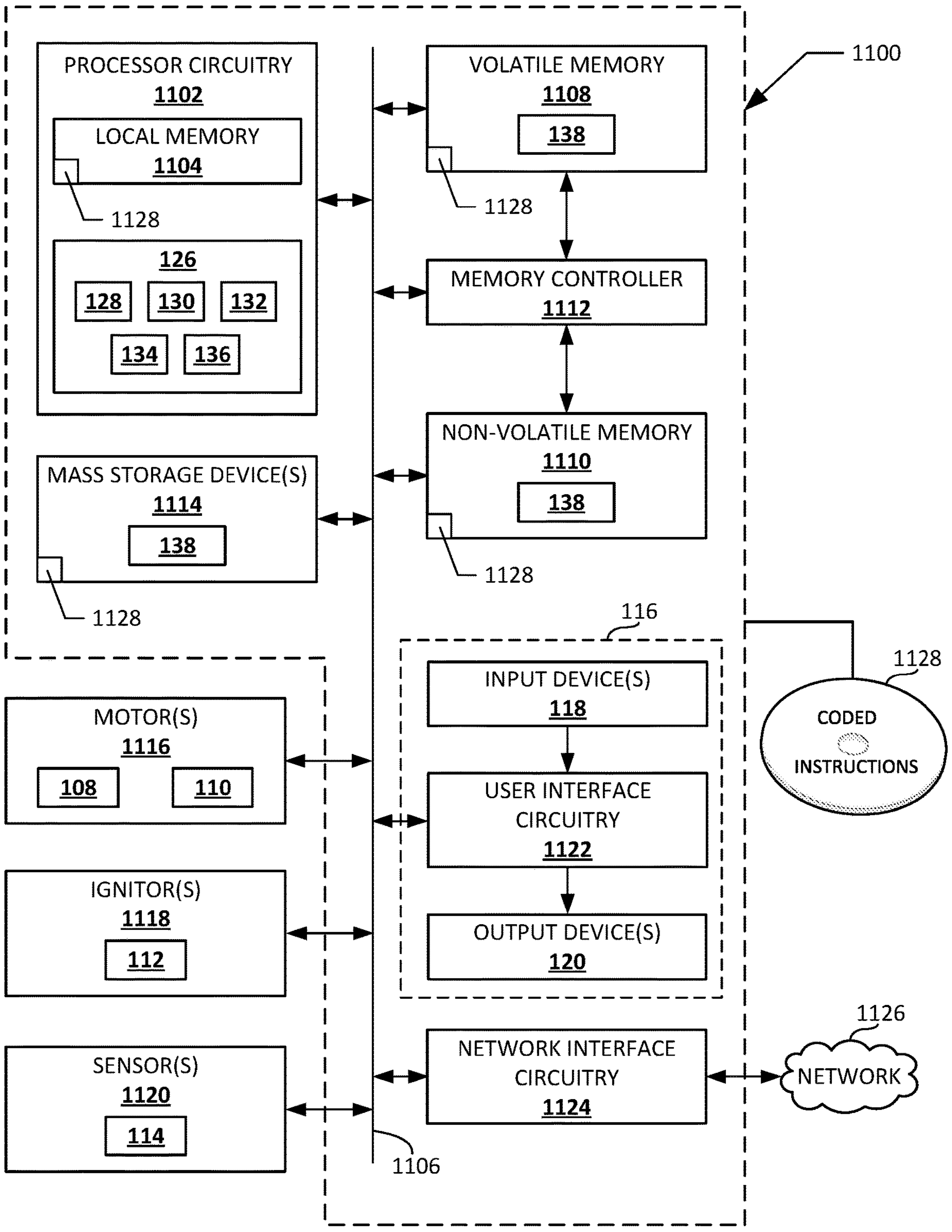
FIG. 11 is a block diagram of an example processor platform including processor circuitry structured to execute and/or instantiate the machine-readable instructions and/or operations of FIGS. 7A-7B, 8, 9, and/or 10 to implement the pellet grill of FIG. 1.

FIG. 11 is a block diagram of an example processor platform 1100 including processor circuitry structured to execute and/or instantiate the machine-readable instructions and/or operations of FIGS. 7A-7B, 8, 9, and/or 10 to implement the pellet grill 100 of FIG. 1. The processor platform 1100 of the illustrated example includes processor circuitry 1102. The processor circuitry 1102 of the illustrated example is hardware. For example, the processor circuitry 1102 can be implemented by one or more integrated circuit(s), logic circuit(s), FPGA(s), microprocessor(s), CPU(s), GPU(s), DSP(s), and/or microcontroller(s) from any desired family or manufacturer. The processor circuitry 1102 may be implemented by one or more semiconductor based (e.g., silicon based) device(s). In this example, the processor circuitry 1102 the mode selection circuitry 128, the PID mode settings selection circuitry 130, the PID mode control circuitry 132, the manual mode settings selection circuitry 134, the manual mode control circuitry 136, and/or, more generally, the controller 126 of FIG. 1.

The processor circuitry 1102 of the illustrated example includes a local memory 1104 (e.g., a cache, registers, etc.). The processor circuitry 1102 is in electrical communication with a main memory via a bus 1106, with the main memory including a volatile memory 1108 and a non-volatile memory 1110. The volatile memory 1108 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1110 may be implemented by flash memory and/or any other desired type of memory device. Access to the main memory 1108, 1110 of the illustrated example is controlled by a memory controller 1112.

The processor platform 1100 of the illustrated example also includes one or more mass storage device(s) 1114 to store software and/or data. Examples of such mass storage device(s) 1114 include magnetic storage devices, optical storage devices, floppy disk drives, HDDs, CDs, Blu-ray disk drives, redundant array of independent disks (RAID) systems, solid state storage devices such as flash memory devices, and DVD drives. In the illustrated example of FIG. 11, one or more of the volatile memory 1108, the non-volatile memory 1110, and/or the mass storage device(s) 1114 implement(s) the memory 138 of FIG. 1.

The processor circuitry 1102 is also in electrical communication with one or more motor(s) 1116 via the bus 1106. In this example, the motor(s) 1116 include the auger motor 108 and the fan motor 110 of FIG. 1. The processor circuitry 1102 is also in electrical communication with one or more ignitor(s) 1118 via the bus 1106. In this example, the ignitor(s) 1118 include the ignitor 112 of FIG. 1. The processor circuitry 1102 is also in electrical communication with one or more sensor(s) 1120 via the bus 1106. In this example, the sensor(s) 1120 include the sensor(s) 114 of FIG. 1.

The processor platform 1100 of the illustrated example also includes user interface circuitry 1122. The user interface circuitry 1122 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In the illustrated example, one or more input device(s) 118 are connected to the user interface circuitry 1122. The input device(s) 118 permit(s) a user to enter data and/or commands into the processor circuitry 1102. The input device(s) 118 can be implemented by, for example, one or more of a touchscreen, a button, a dial, a knob, a switch, an audio sensor, a microphone, an image sensor, a camera, and/or a voice recognition system. One or more output device(s) 120 are also connected to the user interface circuitry 1122 of the illustrated example. The output device(s) 120 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker. The user interface circuitry 1122 of the illustrated example, thus, typically includes a graphics driver card, a graphics driver chip, and/or graphics processor circuitry such as a GPU. In the illustrated example of FIG. 11, the user interface circuitry 1122, the input device(s) 118, and the output device(s) 120 collectively implement the user interface 116 of FIG. 1.

The processor platform 1100 of the illustrated example also includes network interface circuitry 1124. The network interface circuitry 1124 includes one or more communication device(s) (e.g., transmitter(s), receiver(s), transceiver(s), modem(s), gateway(s), wireless access point(s), etc.) to facilitate exchange of data with external machines (e.g., computing devices of any kind, including the remote device(s) 142 of FIG. 1) by a network 1126. The communication can be by, for example, a satellite system, a wireless system, a cellular telephone system, an Ethernet connection, a digital subscriber line (DSL) connection, a telephone line connection, a coaxial cable system, an optical connection, etc. In the illustrated example of FIG. 11, the network interface circuitry 1124 implements the network interface 122 (e.g., including the communication device(s) 124) of FIG. 1.

Coded instructions 1128 including the above-described machine-readable instructions and/or operations of FIGS. 7A-7B, 8, 9, and/or 10 may be stored in the local memory 1104, in the volatile memory 1108, in the non-volatile memory 1110, on the mass storage device(s) 1114, and/or on a removable non-transitory computer-readable storage medium such as a flash memory stick, a dongle, a CD, or a DVD.

Figure 12:
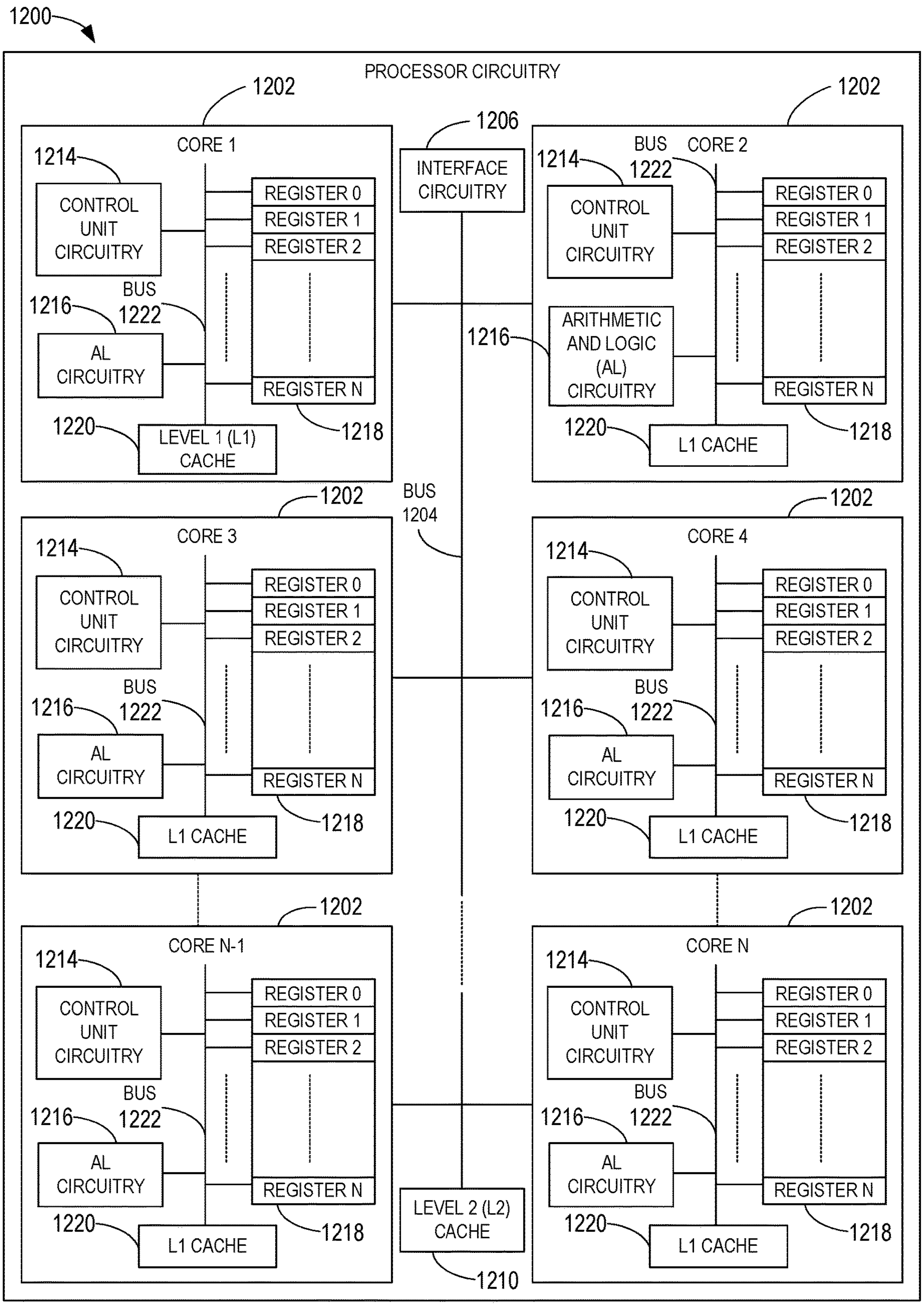
FIG. 12 is a block diagram of an example implementation of the processor circuitry of FIG. 11.

FIG. 12 is a block diagram of an example implementation of the processor circuitry 1102 of FIG. 11. In this example, the processor circuitry 1102 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine-readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine-readable instructions and/or operations represented by the flowcharts of FIGS. 7A-7B, 8, 9, and/or 10.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally, or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1108, 1110 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1222 may implement at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)), and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
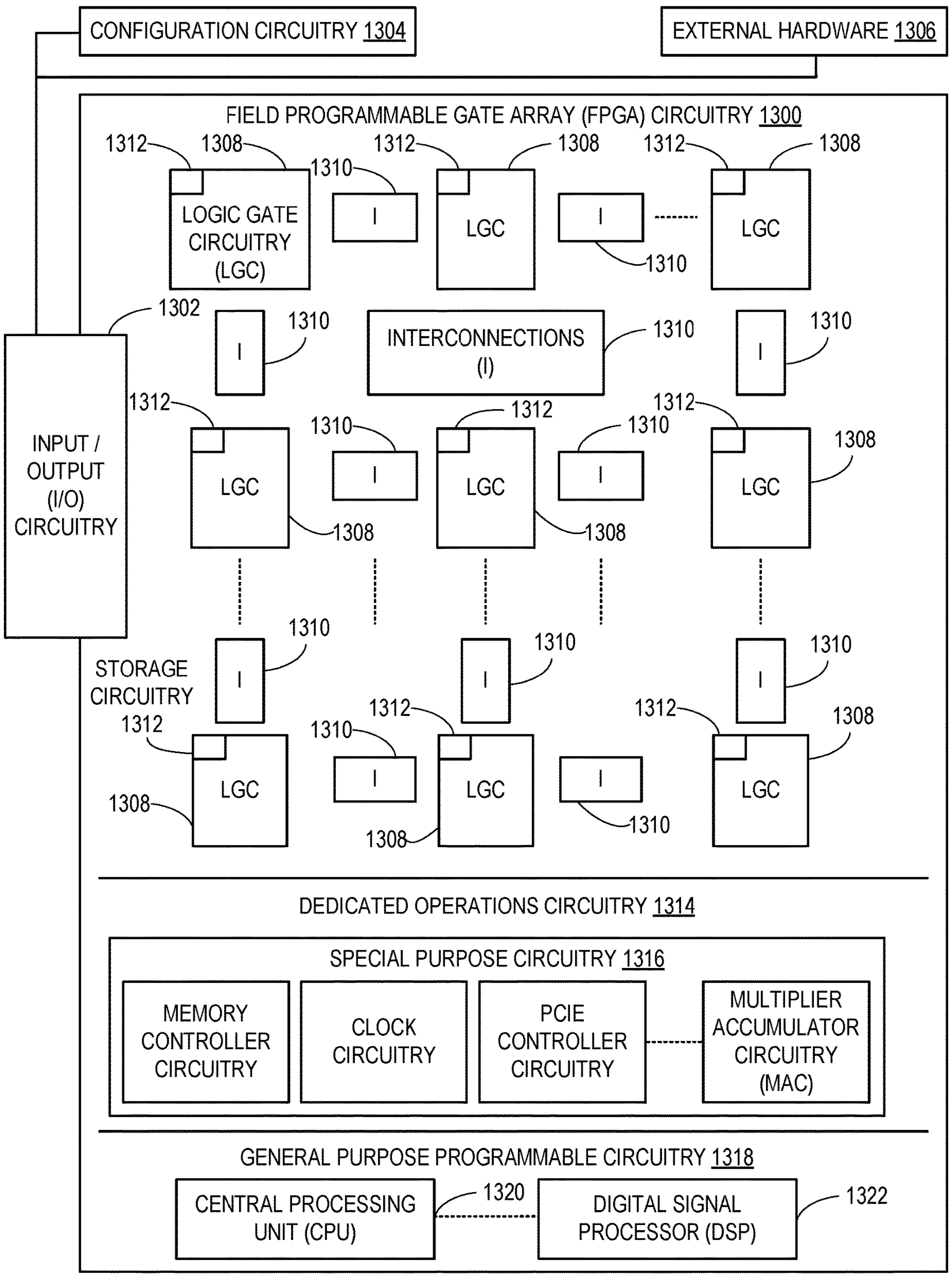
FIG. 13 is a block diagram of another example implementation of the processor circuitry of FIG. 11.

FIG. 13 is a block diagram of another example implementation of the processor circuitry 1102 of FIG. 11. In this example, the processor circuitry 1102 is implemented by FPGA circuitry 1300. The FPGA circuitry 1300 can be used, for example, to perform operations that could otherwise be performed by the example microprocessor 1200 of FIG. 12 executing corresponding machine-readable instructions. However, once configured, the FPGA circuitry 1300 instantiates the machine-readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine-readable instructions and/or operations represented by the flowcharts of FIGS. 7A-7B, 8, 9, and/or 10, but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine-readable instructions and/or operations represented by the flowcharts of FIGS. 7A-7B, 8, 9, and/or 10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 7A-7B, 8, 9, and/or 10. As such, the FPGA circuitry 1300 may be structured to effectively instantiate some or all of the machine-readable instructions of the flowcharts of FIGS. 7A-7B, 8, 9, and/or 10 as dedicated logic circuits to perform the operations corresponding to those software instructions in a dedicated manner analogous to an ASIC. Therefore, the FPGA circuitry 1300 may perform the operations corresponding to the some or all of the machine-readable instructions of FIGS. 7A-7B, 8, 9, and/or 10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13 includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine-readable instructions to configure the FPGA circuitry 1300, or portion(s) thereof. In some such examples, the configuration circuitry 1304 may obtain the machine-readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine-readable instructions of FIGS. 7A-7B, 8, 9, and/or 10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors)

whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1102 of FIG. 11, many other approaches are contemplated. For example, as mentioned above, modern FPGA circuitry may include an on-board CPU, such as one or more of the example CPU 1320 of FIG. 13. Therefore, the processor circuitry 1102 of FIG. 11 may additionally be implemented by combining the example microprocessor 1200 of FIG. 12 and the example FPGA circuitry 1300 of FIG. 13. In some such hybrid examples, a first portion of the machine-readable instructions and/or operations represented by the flowcharts of FIGS. 7A-7B, 8, 9, and/or 10 may be executed by one or more of the cores 1202 of FIG. 12 and a second portion of the machine-readable instructions and/or operations represented by the flowcharts of FIGS. 7A-7B, 8, 9, and/or 10 may be executed by the FPGA circuitry 1300 of FIG. 13.

In some examples, the processor circuitry 1102 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 1102 of FIG. 11, which may be in one or more packages. For example, the XPU may include a CPU in one package, a DSP in another package, a GPU in yet another package, and an FPGA in still yet another package.

From the foregoing, it will be appreciated that the disclosed pellet grills advantageously include one or more selectable manual cook mode(s) (e.g., one or more open-loop, non-feedback system(s)) that enable(s) a user of the pellet grill to have direct control over the auger and/or over the fan of the pellet grill in connection with performing one or more manually-controlled cooking operation(s) via the pellet grill. In some disclosed examples, a pellet grill is configured to implement a selectable manual cook mode. In some disclosed examples, the pellet grill is configured to determine whether a cook mode selection received at the pellet grill is associated with a PID cook mode or a manual cook mode. In response to determining that the cook mode selection is associated with the manual cook mode, the pellet grill is configured to command at least one of an auger or a fan of the pellet grill to perform a manually-controlled cooking operation based on an auger setting selection and a fan setting selection associated with the manual cook mode. In some disclosed examples, the manually-controlled cooking operation is implemented via an open-loop control process.

In some disclosed examples, the pellet grill is configured to implement different types of selectable manual cook modes including, for example, a bounded manual cook mode, a partially-bounded manual cook mode, and/or an unbounded manual cook mode. Each type of selectable manual cook mode advantageously provides a different extent and/or a different degree of manual control (e.g., user control) over the manually-controlled cooking operation to be performed by the auger and/or the fan of the pellet grill. For example, a bounded manual cook mode enables selection of a level setting from among a plurality of available level settings associated with the bounded manual cook mode. In such an example, the auger setting selection and the fan setting selection are predetermined constants that are automatically selected and/or automatically determined based on the level setting selection of the bounded manual cook mode. As another example, a partially-bounded manual cook mode enables selection of a group setting from among a plurality of available group settings associated with the partially-bounded manual cook mode. In such an example, the auger setting selection is selected from among a plurality of available auger settings associated with the group setting selection of the partially-bounded manual cook mode, and the fan setting selection is selected from among a plurality of available fan settings associated with the group setting selection of the partially-bounded manual cook mode. As another example, an unbounded manual cook mode enables the auger setting selection to be selected from among a plurality of available auger settings associated with the unbounded manual cook mode, and further enables the fan setting selection to be selected from among a plurality of available fan settings associated with the unbounded manual cook mode.

The following paragraphs provide various examples in relation to the disclosed pellet grills having selectable manual cook modes.

Example 1 includes a pellet grill. In Example 1, the pellet grill comprises memory, machine-readable instructions, and processor circuitry. In Example 1, the processor circuitry is to execute the machine-readable instructions to determine whether a cook mode selection received at the pellet grill is associated with a proportional-integral-derivative (PID) cook mode or a manual cook mode. In Example 1, in response to the processor circuitry determining that the cook mode selection is associated with the manual cook mode, the processor circuitry is to execute the machine-readable instructions to command at least one of an auger or a fan of the pellet grill to perform a manually-controlled cooking operation based on an auger setting selection and a fan setting selection associated with the manual cook mode.

Example 2 includes the pellet grill of Example 1. In Example 2, the manually-controlled cooking operation is implemented via an open-loop control process.

Example 3 includes the pellet grill of Example 1. In Example 3, in response to the processor circuitry determining that the cook mode selection is associated with the manual cook mode and that a manual cook mode type selection received at the pellet grill is associated with a bounded manual cook mode, the processor circuitry is to execute the machine-readable instructions to determine the auger setting selection and the fan setting selection based on a level setting selection received at the pellet grill, wherein the level setting selection is selected from among available level settings associated with the bounded manual cook mode.

Example 4 includes the pellet grill of Example 1. In Example 4, in response to the processor circuitry determining that the cook mode selection is associated with the manual cook mode and that a manual cook mode type selection received at the pellet grill is associated with a partially-bounded manual cook mode, the processor circuitry is to execute the machine-readable instructions to determine available auger settings and available fan settings associated with a group setting selection received at the pellet grill, wherein the group setting selection is selected from among available group settings associated with the partially-bounded manual cook mode, wherein the auger setting selection is selected from among the available auger settings, and the fan setting selection is selected from among the available fan settings.

Example 5 includes the pellet grill of Example 1. In Example 5, in response to the processor circuitry determining that the cook mode selection is associated with the manual cook mode and that a manual cook mode type selection received at the pellet grill is associated with an unbounded manual cook mode, the processor circuitry is to execute the machine-readable instructions to determine available auger settings and available fan settings associated with the unbounded manual cook mode, wherein the auger setting selection is selected from among the available auger settings, and the fan setting selection is selected from among the available fan settings.

Example 6 includes the pellet grill of Example 1. In Example 6, in response to the processor circuitry determining that the cook mode selection is associated with the PID cook mode, the processor circuitry is to execute the machine-readable instructions to determine whether a temperature setpoint selection associated with the PID cook mode has been received at the pellet grill. In Example 6, in response to the processor circuitry determining that the temperature setpoint selection has been received at the pellet grill, the processor circuitry is to execute the machine-readable instructions to command the auger and the fan to perform a PID-controlled cooking operation based on the temperature setpoint selection.

Example 7 includes the pellet grill of Example 6. In Example 7, the PID-controlled cooking operation is implemented via a closed-loop control process that receives control feedback based on a measured temperature within a cooking chamber of the pellet grill.

Example 8 includes a non-transitory machine-readable storage medium comprising instructions. When executed, the instructions of Example 8 cause processor circuitry of a pellet grill to determine whether a cook mode selection received at the pellet grill is associated with a proportional-integral-derivative (PID) cook mode or a manual cook mode. In response to the processor circuitry determining that the cook mode selection is associated with the manual cook mode, the instructions of Example 8, when executed, cause the processor circuitry to command at least one of an auger or a fan of the pellet grill to perform a manually-controlled cooking operation based on an auger setting selection and a fan setting selection associated with the manual cook mode.

Example 9 includes the non-transitory machine-readable storage medium of Example 8. In Example 9, the manually-controlled cooking operation is implemented via an open-loop control process.

Example 10 includes the non-transitory machine-readable storage medium of Example 8. In response to the processor circuitry determining that the cook mode selection is associated with the manual cook mode and that a manual cook mode type selection received at the pellet grill is associated with a bounded manual cook mode, the instructions of Example 10, when executed, cause the processor circuitry to determine the auger setting selection and the fan setting selection based on a level setting selection received at the pellet grill, wherein the level setting selection is selected from among available level settings associated with the bounded manual cook mode.

Example 11 includes the non-transitory machine-readable storage medium of Example 8. In response to the processor circuitry determining that the cook mode selection is associated with the manual cook mode and that a manual cook mode type selection received at the pellet grill is associated with a partially-bounded manual cook mode, the instructions of Example 11, when executed, cause the processor circuitry to determine available auger settings and available fan settings associated with a group setting selection received at the pellet grill, wherein the group setting selection is selected from among available group settings associated with the partially-bounded manual cook mode, wherein the auger setting selection is selected from among the available auger settings, and the fan setting selection is selected from among the available fan settings.

Example 12 includes the non-transitory machine-readable storage medium of Example 8. In response to the processor circuitry determining that the cook mode selection is associated with the manual cook mode and that a manual cook mode type selection received at the pellet grill is associated with an unbounded manual cook mode, the instructions of Example 12, when executed, cause the processor circuitry to determine available auger settings and available fan settings associated with the unbounded manual cook mode, wherein the auger setting selection is selected from among the available auger settings, and the fan setting selection is selected from among the available fan settings.

Example 13 includes the non-transitory machine-readable storage medium of Example 8. In response to the processor circuitry determining that the cook mode selection is associated with the PID cook mode, the instructions of Example 13, when executed, cause the processor circuitry to determine whether a temperature setpoint selection associated with the PID cook mode has been received at the pellet grill. In response to the processor circuitry determining that the temperature setpoint selection has been received at the pellet grill, the instructions of Example 13, when executed, cause the processor circuitry to command the auger and the fan to perform a PID-controlled cooking operation based on the temperature setpoint selection.

Example 14 includes the non-transitory machine-readable storage medium of Example 13. In Example 14, the PID-controlled cooking operation is implemented via a closed-loop control process that receives control feedback based on a measured temperature within a cooking chamber of the pellet grill.

Example 15 includes a method. In Example 15, the method comprises determining, by executing machine-readable instructions with processor circuitry of a pellet grill, whether a cook mode selection received at the pellet grill is associated with a proportional-integral-derivative (PID) cook mode or a manual cook mode. In example 15, in response to the determining that the cook mode selection is associated with the manual cook mode, the method further comprises commanding, by executing machine-readable instructions with the processor circuitry, at least one of an auger or a fan of the pellet grill to perform a manually-controlled cooking operation based on an auger setting selection and a fan setting selection associated with the manual cook mode.

Example 16 includes the method of Example 15. In Example 16, the manually-controlled cooking operation is implemented via an open-loop control process.

Example 17 includes the method of Example 15. In Example 17, in response to determining that the cook mode selection is associated with the manual cook mode and that a manual cook mode type selection received at the pellet grill is associated with a bounded manual cook mode, the method further comprises determining the auger setting selection and the fan setting selection based on a level setting selection received at the pellet grill, wherein the level setting selection is selected from among available level settings associated with the bounded manual cook mode.

Example 18 includes the method of Example 15. In Example 18, in response to determining that the cook mode selection is associated with the manual cook mode and that a manual cook mode type selection received at the pellet grill is associated with a partially-bounded manual cook mode, the method further comprises determining available auger settings and available fan settings associated with a group setting selection received at the pellet grill, wherein the group setting selection is selected from among available group settings associated with the partially-bounded manual cook mode, wherein the auger setting selection is selected from among the available auger settings, and the fan setting selection is selected from among the available fan settings.

Example 19 includes the method of Example 15. In Example 19, in response to determining that the cook mode selection is associated with the manual cook mode and that a manual cook mode type selection received at the pellet grill is associated with an unbounded manual cook mode, the method further comprises determining available auger settings and available fan settings associated with the unbounded manual cook mode, wherein the auger setting selection is selected from among the available auger settings, and the fan setting selection is selected from among the available fan settings.

Example 20 includes the method of Example 15. In Example 20, in response to determining that the cook mode selection is associated with the PID cook mode, the method further comprises determining whether a temperature setpoint selection associated with the PID cook mode has been received at the pellet grill. In Example 20, in response to determining that the temperature setpoint selection has been received at the pellet grill, the method further comprises commanding the auger and the fan to perform a PID-controlled cooking operation based on the temperature setpoint selection, wherein the PID-controlled cooking operation is implemented via a closed-loop control process that receives control feedback based on a measured temperature within a cooking chamber of the pellet grill.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A pellet grill, comprising:

memory;

machine-readable instructions; and processor circuitry configured to execute the machine-readable instructions to:

determine whether a cook mode selection received at the pellet grill is associated with a proportional-integral-derivative (PID) cook mode or a manual cook mode; and in response to determining that the cook mode selection is associated with the manual cook mode, command an auger and a fan of the pellet grill to perform a manually-controlled cooking operation implemented via an open-loop non-feedback control process that is based on an auger setting selection and a fan setting selection associated with the manual cook mode.

2. The pellet grill of claim 1, wherein, in response to the processor circuitry determining that the cook mode selection is associated with the manual cook mode and that a manual cook mode type selection received at the pellet grill is associated with a bounded manual cook mode, the processor circuitry is configured to execute the machine-readable instructions to determine the auger setting selection and the fan setting selection based on a level setting selection received at the pellet grill, wherein the level setting selection is selected from among available level settings associated with the bounded manual cook mode.

3. The pellet grill of claim 1, wherein, in response to the processor circuitry determining that the cook mode selection is associated with the manual cook mode and that a manual cook mode type selection received at the pellet grill is associated with a partially-bounded manual cook mode, the processor circuitry is configured to execute the machine-readable instructions to determine available auger settings and available fan settings associated with a group setting selection received at the pellet grill, wherein the group setting selection is selected from among available group settings associated with the partially-bounded manual cook mode, wherein the auger setting selection is selected from among the available auger settings, and the fan setting selection is selected from among the available fan settings.

4. The pellet grill of claim 1, wherein, in response to the processor circuitry determining that the cook mode selection is associated with the manual cook mode and that a manual cook mode type selection received at the pellet grill is associated with an unbounded manual cook mode, the processor circuitry is configured to execute the machine-readable instructions to determine available auger settings and available fan settings associated with the unbounded manual cook mode, wherein the auger setting selection is selected from among the available auger settings, and the fan setting selection is selected from among the available fan settings.

5. The pellet grill of claim 1, wherein, in response to the processor circuitry determining that the cook mode selection is associated with the PID cook mode, the processor circuitry is configured to execute the machine-readable instructions to:

determine whether a temperature setpoint selection associated with the PID cook mode has been received at the pellet grill; and in response to determining that the temperature setpoint selection has been received at the pellet grill, command the auger and the fan to perform a PID-controlled cooking operation implemented via a closed-loop feedback control process that is based on the temperature setpoint selection and that receives control feedback based on a measured temperature within a cooking chamber of the pellet grill.

6. The pellet grill of claim 1, wherein the open-loop non-feedback control process is implemented without regard to a temperature setpoint selection.

7. The pellet grill of claim 1, wherein the open-loop non-feedback control process is implemented without regard to a measured temperature within a cooking chamber of the pellet grill.

8. The pellet grill of claim 1, wherein the open-loop non-feedback control process enables a user of the pellet grill to have direct control over the auger and the fan in connection with performance of the manually-controlled cooking operation.

9. A non-transitory machine-readable storage medium comprising instructions that, when executed, cause processor circuitry of a pellet grill to at least:

determine whether a cook mode selection received at the pellet grill is associated with a proportional-integral-derivative (PID) cook mode or a manual cook mode; and in response to determining that the cook mode selection is associated with the manual cook mode, command an auger and a fan of the pellet grill to perform a manually-controlled cooking operation implemented via an open-loop non-feedback control process that is based on an auger setting selection and a fan setting selection associated with the manual cook mode.

10. The non-transitory machine-readable storage medium of claim 9, wherein, in response to the processor circuitry determining that the cook mode selection is associated with the manual cook mode and that a manual cook mode type selection received at the pellet grill is associated with a bounded manual cook mode, the instructions, when executed, cause the processor circuitry to determine the auger setting selection and the fan setting selection based on a level setting selection received at the pellet grill, wherein the level setting selection is selected from among available level settings associated with the bounded manual cook mode.

11. The non-transitory machine-readable storage medium of claim 9, wherein, in response to the processor circuitry determining that the cook mode selection is associated with the manual cook mode and that a manual cook mode type selection received at the pellet grill is associated with a partially-bounded manual cook mode, the instructions, when executed, cause the processor circuitry to determine available auger settings and available fan settings associated with a group setting selection received at the pellet grill, wherein the group setting selection is selected from among available group settings associated with the partially-bounded manual cook mode, wherein the auger setting selection is selected from among the available auger settings, and the fan setting selection is selected from among the available fan settings.

12. The non-transitory machine-readable storage medium of claim 9, wherein, in response to the processor circuitry determining that the cook mode selection is associated with the manual cook mode and that a manual cook mode type selection received at the pellet grill is associated with an unbounded manual cook mode, the instructions, when executed, cause the processor circuitry to determine available auger settings and available fan settings associated with the unbounded manual cook mode, wherein the auger setting selection is selected from among the available auger settings, and the fan setting selection is selected from among the available fan settings.

13. The non-transitory machine-readable storage medium of claim 9, wherein, in response to the processor circuitry determining that the cook mode selection is associated with the PID cook mode, the instructions, when executed, cause the processor circuitry to:

determine whether a temperature setpoint selection associated with the PID cook mode has been received at the pellet grill; and in response to determining that the temperature setpoint selection has been received at the pellet grill, command the auger and the fan to perform a PID-controlled cooking operation implemented via a closed-loop feedback control process that is based on the temperature setpoint selection and that receives control feedback based on a measured temperature within a cooking chamber of the pellet grill.

14. The non-transitory machine-readable storage medium of claim 9, wherein the open-loop non-feedback control process enables a user of the pellet grill to have direct control over the auger and the fan in connection with performance of the manually-controlled cooking operation.

15. A method, comprising:

determining, by executing machine-readable instructions with processor circuitry of a pellet grill, whether a cook mode selection received at the pellet grill is associated with a proportional-integral-derivative (PID) cook mode or a manual cook mode; and in response to determining that the cook mode selection is associated with the manual cook mode, commanding, by executing machine-readable instructions with the processor circuitry, an auger and a fan of the pellet grill to perform a manually-controlled cooking operation implemented via an open-loop non-feedback control process that is based on an auger setting selection and a fan setting selection associated with the manual cook mode.

16. The method of claim 15, wherein, in response to determining that the cook mode selection is associated with the manual cook mode and that a manual cook mode type selection received at the pellet grill is associated with a bounded manual cook mode, the method further comprises determining the auger setting selection and the fan setting selection based on a level setting selection received at the pellet grill, wherein the level setting selection is selected from among available level settings associated with the bounded manual cook mode.

17. The method of claim 15, wherein, in response to determining that the cook mode selection is associated with the manual cook mode and that a manual cook mode type selection received at the pellet grill is associated with a partially-bounded manual cook mode, the method further comprises determining available auger settings and available fan settings associated with a group setting selection received at the pellet grill, wherein the group setting selection is selected from among available group settings associated with the partially-bounded manual cook mode, wherein the auger setting selection is selected from among the available auger settings, and the fan setting selection is selected from among the available fan settings.

18. The method of claim 15, wherein, in response to determining that the cook mode selection is associated with the manual cook mode and that a manual cook mode type selection received at the pellet grill is associated with an unbounded manual cook mode, the method further comprises determining available auger settings and available fan settings associated with the unbounded manual cook mode, wherein the auger setting selection is selected from among the available auger settings, and the fan setting selection is selected from among the available fan settings.

19. The method of claim 15, wherein, in response to determining that the cook mode selection is associated with the PID cook mode, the method further comprises:

determining whether a temperature setpoint selection associated with the PID cook mode has been received at the pellet grill; and in response to determining that the temperature setpoint selection has been received at the pellet grill, commanding the auger and the fan to perform a PID-controlled cooking operation implemented via a closed-loop feedback control process that is based on the temperature setpoint selection and that receives control feedback based on a measured temperature within a cooking chamber of the pellet grill.

20. The method of claim 15, wherein the open-loop non-feedback control process enables a user of the pellet grill to have direct control over the auger and the fan in connection with performance of the manually-controlled cooking operation.

* * * * *